US012674344B2

(12) United States Patent
Lanzani

(10) Patent No.: US 12,674,344 B2
(45) Date of Patent: Jul. 7, 2026

(54) HINGE IN PARTICULAR FOR HOUSEHOLD APPLIANCE

(71) Applicant: Oreste Lanzani, Bagnolo Mella (IT)

(72) Inventor: Oreste Lanzani, Bagnolo Mella (IT)

(73) Assignee: Oreste Lanzani, Bagnolo Mella (IT)

( * ) Notice: Subject to any disclaimer, the term of this patent is extended or adjusted under 35 U.S.C. 154(b) by 0 days.

(21) Appl. No.: 18/727,545

(22) PCT Filed: Dec. 29, 2022

(86) PCT No.: PCT/IB2022/062867
§ 371 (c)(1),
(2) Date: Jul. 9, 2024

(87) PCT Pub. No.: WO2023/131857
PCT Pub. Date: Jul. 13, 2023

(65) Prior Publication Data

US 2025/0084682 A1 Mar. 13, 2025

(30) Foreign Application Priority Data

Jan. 10, 2022 (IT) ........................ 102022000000212

(51) Int. Cl.
*E05F 1/08* (2006.01)
*E05D 3/14* (2006.01)
*E05F 3/20* (2006.01)

(52) U.S. Cl.
CPC .................. *E05D 3/14* (2013.01); *E05F 3/20* (2013.01); *E05Y 2201/256* (2013.01); *E05Y 2201/264* (2013.01); *E05Y 2900/31* (2013.01)

(58) Field of Classification Search
CPC ......... E05Y 2201/256; E05Y 2201/262; E05Y 2201/264; E05Y 2900/31; E05Y 2900/132;

(Continued)

(56) References Cited

U.S. PATENT DOCUMENTS 5,471,709 A * 12/1995 Lanzani ................ F25D 23/026 16/302
7,934,290 B2 * 5/2011 Gherardi ............... F24C 15/023 16/280

(Continued)

FOREIGN PATENT DOCUMENTS

CN 208605069 U * 3/2019

*Primary Examiner* — Chuck Y Mah
(74) *Attorney, Agent, or Firm* — Dickinson Wright PLLC; Andrew D. Dorisio

(57) ABSTRACT

A hinge in particular for a household appliance, for example a refrigerator, adapted to connect together at least one closing element 1, 1' with the body 2 of said household appliance 3 at an opening 4 provided in said body, said hinge allowing to roto-translate said closing element 1, 1' between a first operating position P1 in which it closes said opening 4, to a second operating position P2, P3 angularly spaced by at least 90° with respect to said first operating position P1, and preferably angularly spaced by at least 100°, said hinge comprising: a first support structure 5 adapted to be constrained to a front bearing structure or wall 2A of the body 2 of said household appliance 3, a second support structure 6 adapted to be constrained to said closing element 1, 1', a first 7 and a second 8 connecting element adapted to connect together said first 5 and second 6 support structures, and a first elastically deformable member 9 which interact s with at least one 8 of said two connecting element s to exert a force that pushes said closing element 1, 1' against said opening 4 of the body 2 of the household appliance at least when said closing element 1, 1' is in its first operating position P1; wherein said first and second connecting ele-ment s 7, 8 and the first and second support structures 5, 6 form an articulated quadrilateral system 10.

20 Claims, 18 Drawing Sheets

(58) Field of Classification Search

CPC ................ E05Y 16/387; E05Y 16/286; E05Y 16/36637; E05Y 16/371; H01R 35/02; H01R 35/04; H01H 3/162; H01H 3/161; H01H 13/10; E05D 11/00; E05D 11/0081; E05D 3/02; E05D 3/14; E05D 2003/025; E05D 2900/531; E05D 2800/678; E05D 7/00; E05D 5/04; E05F 3/20; E05F 3/227; E05F 3/228; B21D 53/40

See application file for complete search history.

(56) References Cited

U.S. PATENT DOCUMENTS

| | | | | |
|---|---|---|---|---|
| 8,938,854 | B2 | 1/2015 | Lanzani | |
| 9,820,586 | B1 * | 11/2017 | Goppion | E05D 3/14 |
| 9,903,146 | B2 * | 2/2018 | Nordieker | E05F 3/221 |
| 11,021,901 | B2 * | 6/2021 | Thielmann | E05D 11/0054 |
| 2011/0000050 | A1 * | 1/2011 | Lanzani | F25D 23/028 16/382 |
| 2012/0118842 | A1 * | 5/2012 | Salice | E05F 1/1284 211/144 |
| 2013/0221825 | A1 * | 8/2013 | Bonomie | E05F 3/227 16/303 |

* cited by examiner

HINGE IN PARTICULAR FOR HOUSEHOLD APPLIANCE

TECHNICAL FIELD

The present invention relates to a hinge according to the pre-characterizing part of claim 1.

Hinges of the type indicated above have long been known; they are for example described in U.S. Pat. Nos. 5,471,709, 8,938,854, US Pat. No. 2011/000050 and have long been marketed under the trademark "INGOL".

BACKGROUND

The known hinges are preferably used to support doors of refrigerators of small, medium, or large size, both of the free-standing and built-in type, but they can also be used in other types of household appliances such as vertical refrigerator-freezers, chest freezers, ovens for cooking, washing machines, dishwashers and others.

The known hinges can have a vertical or horizontal rotation axis.

The known "INGOL" hinges have been produced and marketed in millions of models and have achieved considerable success due to the totally innovative and different technical solutions compared to the hinges on the market for similar uses (for example the hinges produced by the German company Hettich).

However, the known "INGOL" hinges still have drawbacks.

U.S. Pat. No. 8,938,854 describes a hinge according to the pre-characterizing part of the main claim, in particular with reference to this hinge, a first drawback is due to the hinge sizes and the overall dimensions thereof which are not always considered acceptable by the manufacturers of the household appliances they must be installed in and which also negatively affects the production costs of the hinge itself.

A further drawback is due to the fact that the free space provided amid the components of the hinge is extremely limited and does not allow any accessory components of the hinge to be added to the hinge (such as elastic means and/or devices for limiting the door opening).

A further drawback is due to the shape of the various components of the hinge, which is relatively complicated and implies the need to manufacture the current hinges in expensive materials, such as sintered materials.

A further drawback is due to the fact that some areas of the hinge components are subject to stresses which in some circumstances can be high and can reduce the efficiency and/or life of the hinge.

SUMMARY

The object of the present invention is to provide an improved hinge, with respect to the known "INGOL" hinges, which allows to reduce the size and consequently the costs for producing and assembling the hinge components, while being able to be associated with usual household appliances.

A further object is to provide a hinge which simplifies the production of at least some of its components, so as to reduce the hinge production costs.

A further object is to provide a hinge which allows to enhance the efficiency and/or duration of the hinge, reducing the stresses in some areas of the hinge itself.

A further object is to provide a hinge which allows accessory components to be inserted into the hinge (such as elastic means and/or devices for limiting the stroke of the hinge), while having reduced size and dimensions compared to known hinges of the same type.

A further object is to provide a hinge which allows easy built-in installation for present or future appliances (household appliances, in particular refrigerators) designed for free installation. In particular, the invention aims to prevent the appliance door from interfering with adjacent furniture when rotated. This is a huge advantage for appliances manufacturers which also makes it possible to eliminate specific production lines for built-in appliances.

These and other objects which will be evident to those skilled in the art are achieved by a hinge according to the attached claims.

BRIEF DESCRIPTION OF THE DRAWINGS

For a better understanding of the present invention, drawings are attached, by way of a non-limiting example, in which:

FIGS. 5A, 5B, 5C are schematic views like that of FIGS. 2, 3 and 4 but with the hinge associated with a door of a free-standing refrigerator which is also built-in;

FIG. 8D is a top view of the third component like that of FIG. 8A wherein, however, an additional component not shown in FIG. 8A is also shown.

DETAILED DESCRIPTION

Figure 1A:
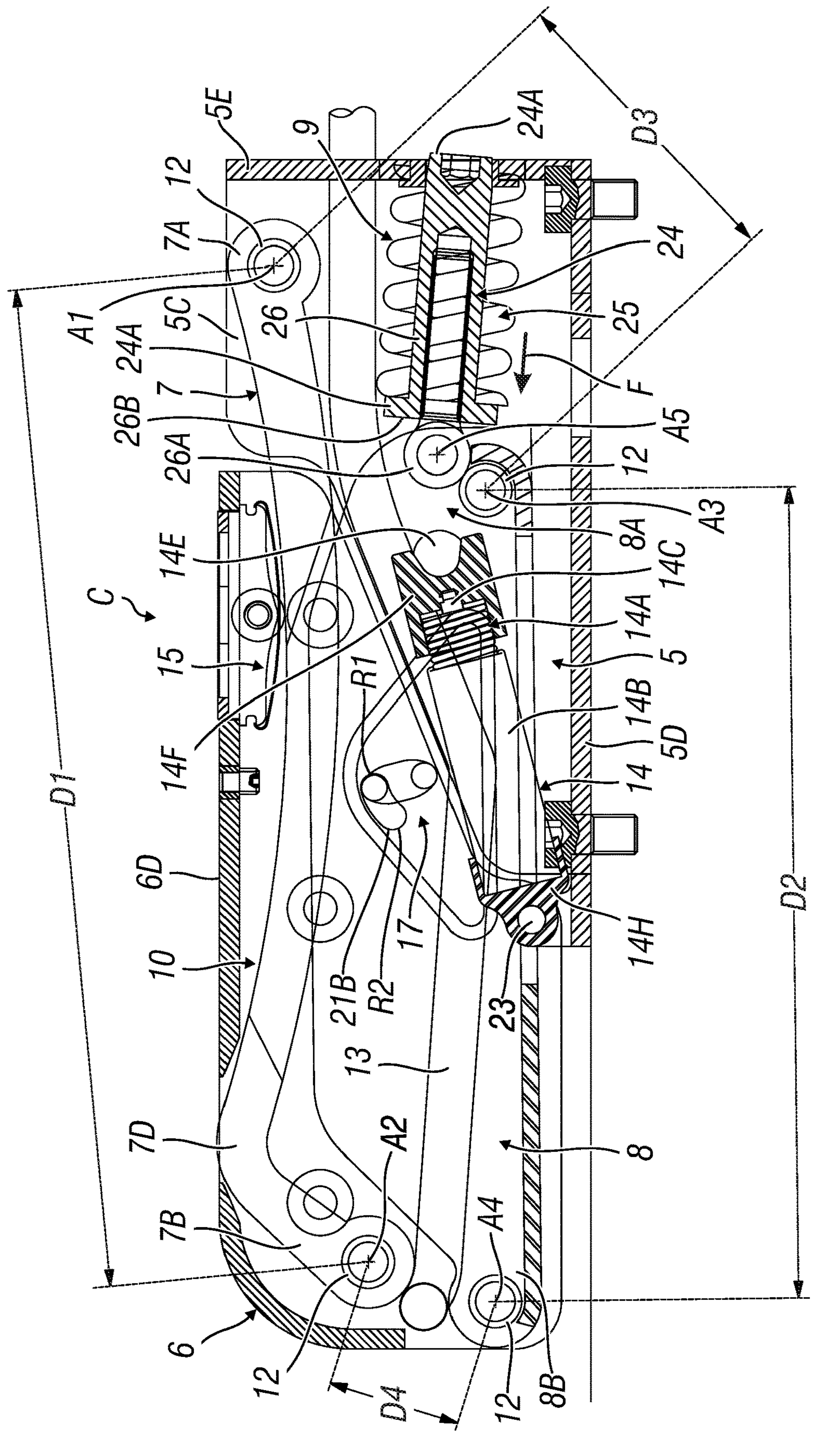
FIGS. 1A and 1B are partially sectioned enlarged schematic top views of a hinge according to the invention.

With reference to the aforementioned figures, they show a hinge in particular for a household appliance, for example a refrigerator, adapted to connect together at least one closing element 1 (FIG. 2) of said household appliance 3, and preferably a flat face 1A of said closing element 1, with the body 2 (partially shown) of said household appliance 3, at an opening 4, provided in said body, said hinge allowing said closing element 1 to roto-translate between a first operating position P1 (FIG. 2) in which it closes said opening 4, and a second operating position P2 (FIG. 3), angularly spaced by at least 90° with respect to said first operating position P1, and preferably angularly spaced by at least 100° (position P3 of FIG. 4) or even angularly spaced by a greater angle.

The hinge comprises:

a first support structure 5 (FIGS. 1, 1bis and 6) comprising a first flat wall 5D adapted to be constrained to a front bearing structure or wall 2A (FIG. 2) of the body 2 of said household appliance 3, a second support structure 6 (FIGS. 1, 1bis and 7) comprising a second flat wall 6D adapted to be constrained to said closing element 1 (FIG. 2), a first 7 and a second 8 connecting element (FIG. 1, 8, 9) adapted to connect together said first 5 and second 6 support structures, and a first elastically deformable member 9 which interacts with at least one 8 of said two connecting elements (in FIG. 1 it interacts with the second connecting element 8), to exert a force F that pushes said closing element 1 against said opening 4 of the body 2 of the household appliance at least when said closing element 1 is in its first operating position P1.

Figure 6A:
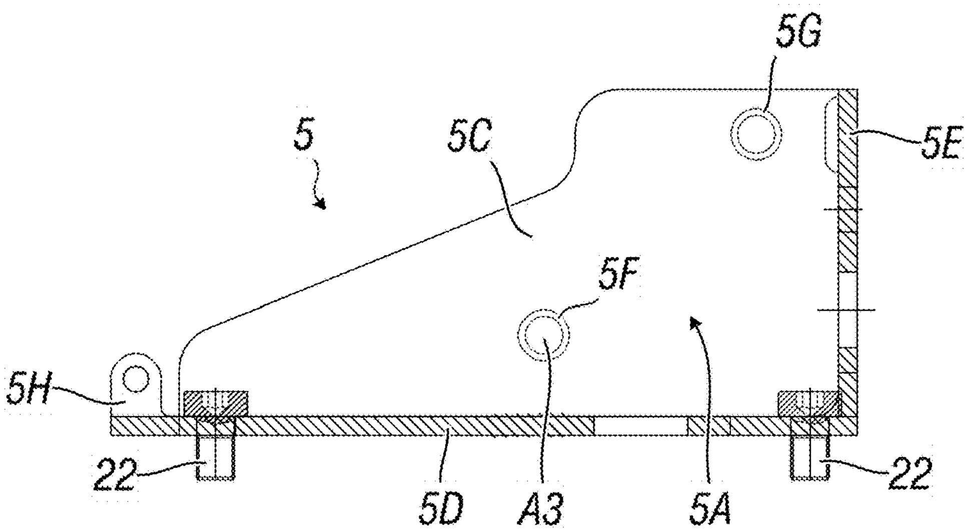
FIGS. 6A-C are partially sectioned orthogonal schematic views of a first component of the hinge.
Figure 7A:
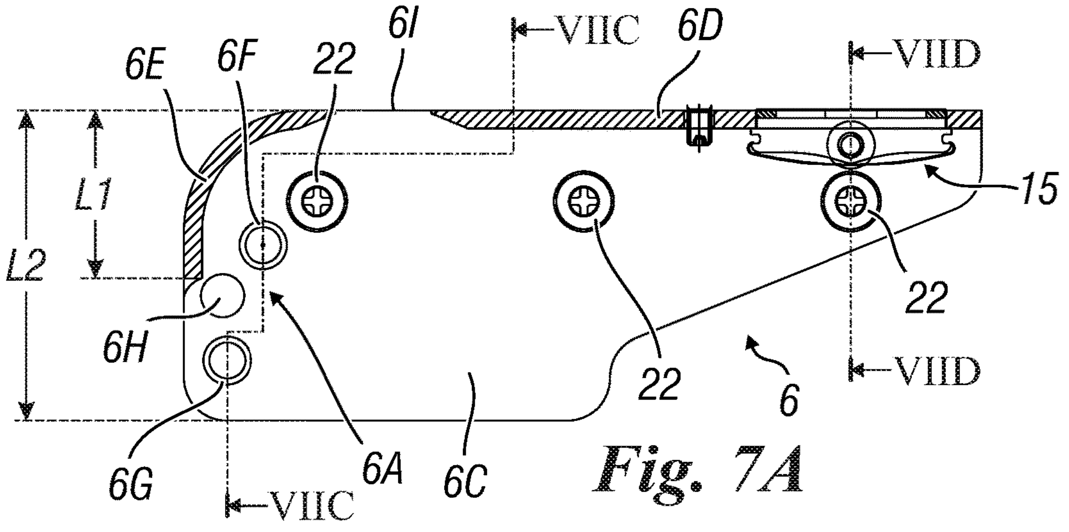
FIGS. 7A-D are partially sectioned orthogonal schematic views of a second component of the hinge (the sections referred to in FIGS. 7C and 7D are taken according to the lines VIIC and VIID of FIG. 7A, respectively)
Figure 7B:
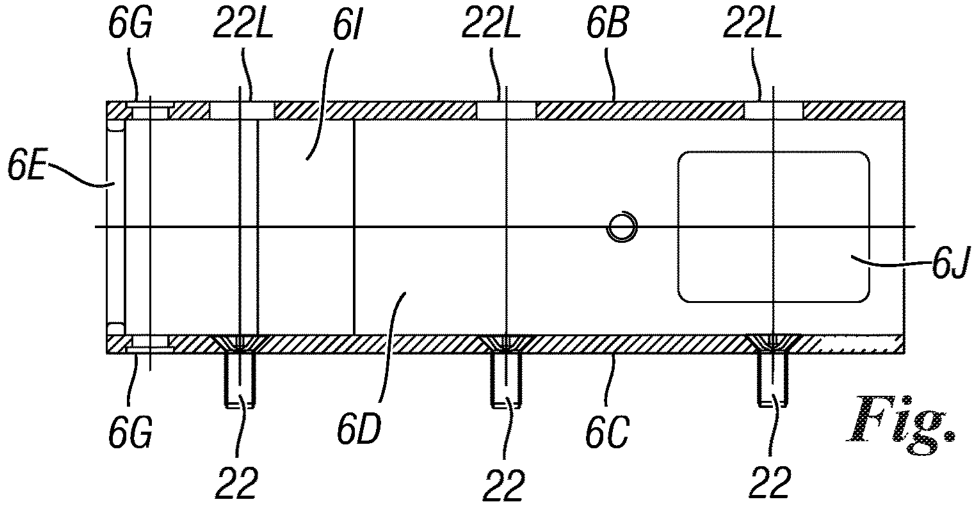
Figure 7C:
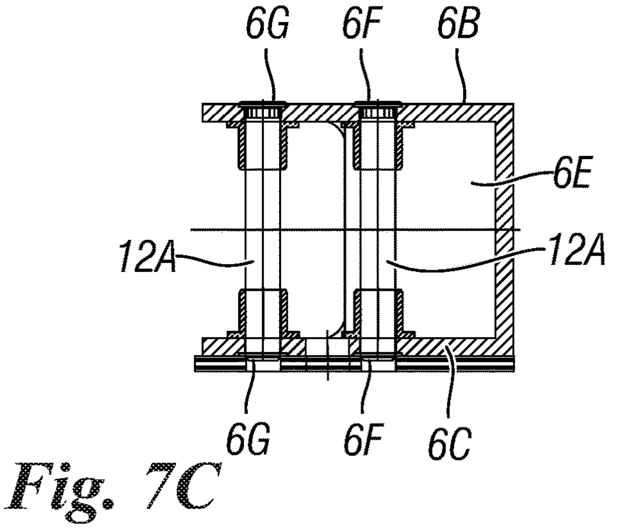
Figure 7D:
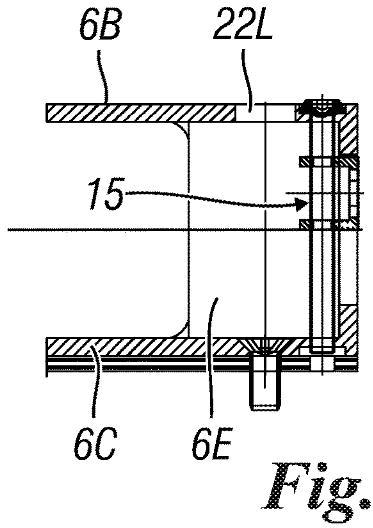

The first and second connecting elements 7, 8 and the first and second support structure 5, 6 form an articulated quadrilateral system 10:

the four components of said articulated quadrilateral system 10 consist of: said first connecting element 7, said second connecting element 8, and at least one first 5 (FIG. 6A) and one second 6A (FIG. 7A) portion of said first 5 and second 6 support structures, respectively.

Figure 2:
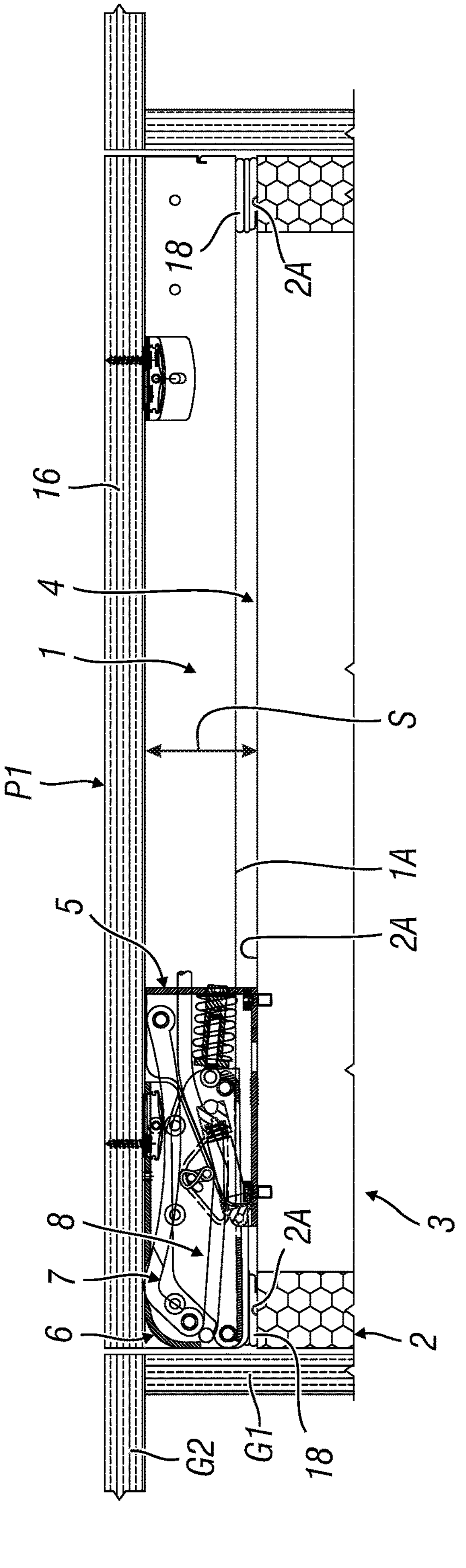
FIGS. 2, 3, 4, are partially sectioned top views of the hinge in different scales and in different use positions (0°, 90°, 106°), when it is applied to a refrigerator built into a piece of cabinetry and with a panel constrained to the refrigerator door.
Figure 3:
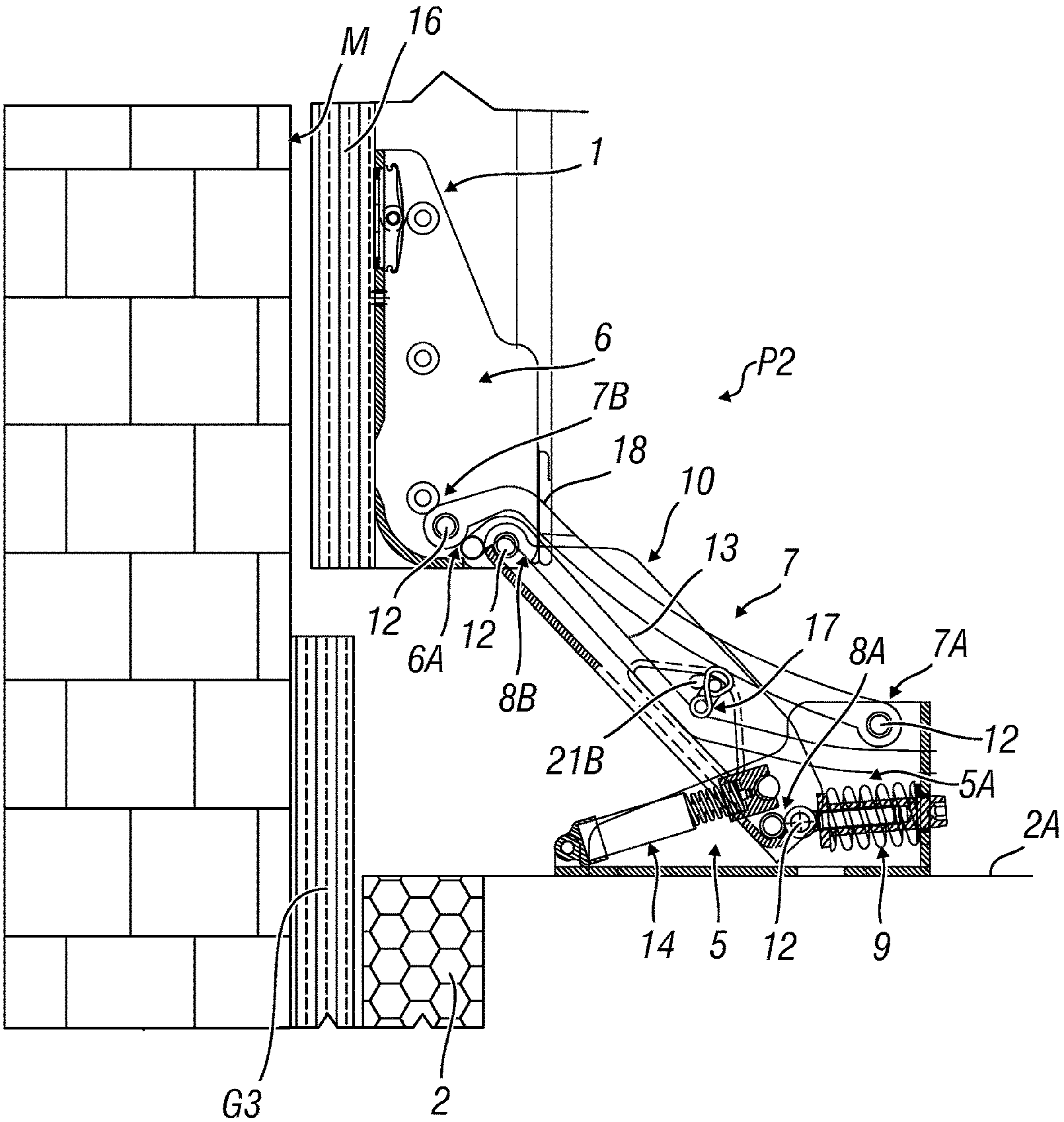
Figure 4:
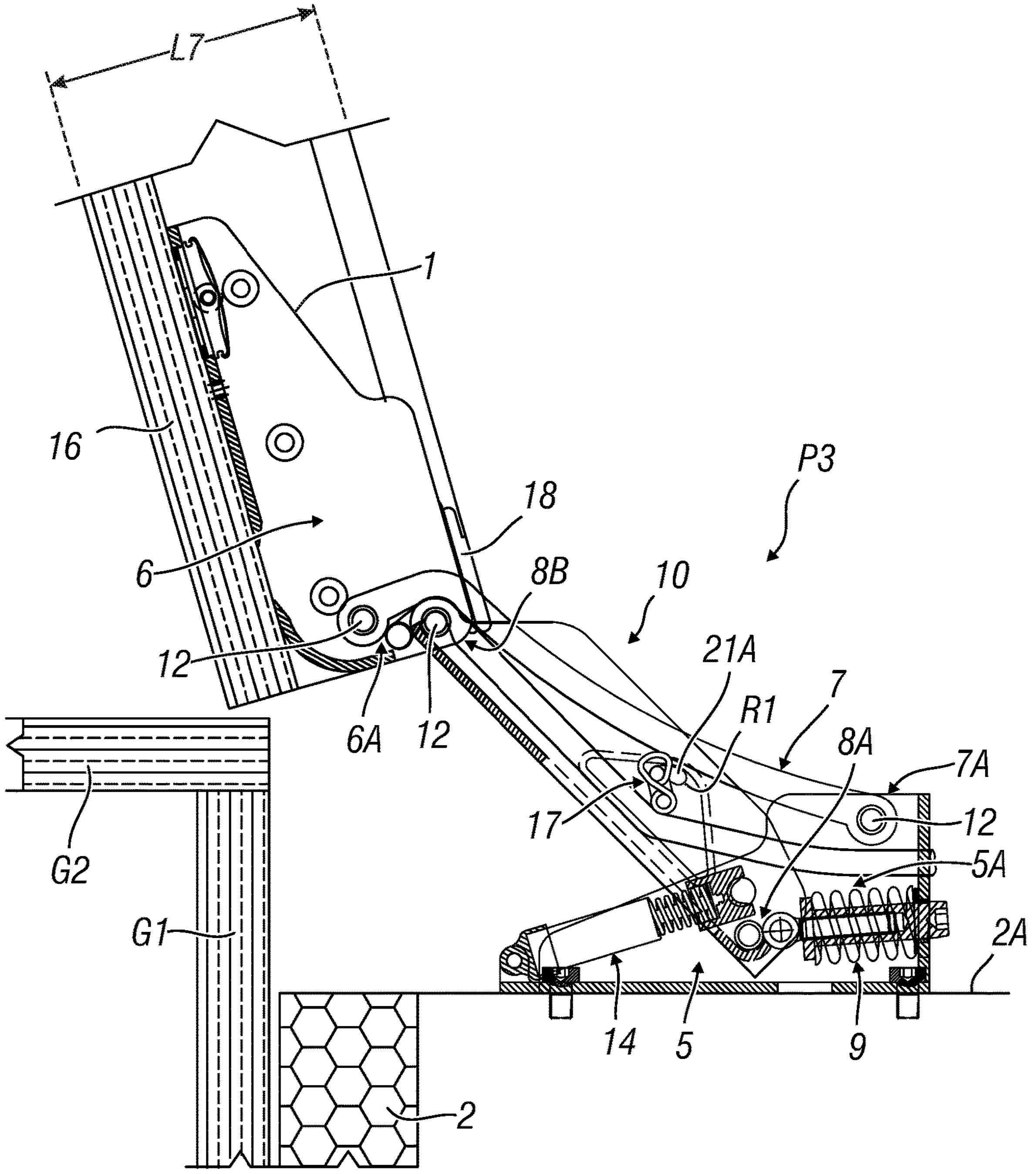

The articulated quadrilateral system 10 is adapted to define a member for opening and closing said closing element 1 between the operating positions P1-P3 (FIGS. 2-4).

The articulated quadrilateral system 10 comprises hinge elements 12 (FIG. 1) of end portions 7A, 7B, 8A, 8B (FIG. 1) of the first 7 and second 8 connecting elements for connection to the first 5 and second 6 support structures.

In the closed position C (FIG. 1) of the articulated quadrilateral system 10, the closing element 1 of the household appliance 3 closes the opening 4 of the body 2 of the household appliance, and said first and second flat walls 5D, 6D, of the first 5 and second 6 support structures, respectively, are substantially parallel to each other.

In the closed position C (FIG. 1) of the articulated quadrilateral system 10, the hinge axes A1-A2-A3-A4 (FIG. 1) of the articulated quadrilateral system 10 define:

a first distance D1 defined by the line passing through the hinge axes A1, A2 provided in the first 7A end and in the second 7B ends of the first connecting element 7, a second distance D2 defined by the line passing through the hinge axes A3, A4 provided in the first end 8A and in the second end 8B of the second connecting element 8, a third distance D3 defined by the line passing through the hinge axes A1, A3 provided in the first end 7A of the first connecting element 7 and the first end 8A of the second connecting element 8, a fourth distance D4 defined by the line passing through the hinge axes A2, A4 provided in the second end 7B of the first connecting element 7 and the second end 8B of the second connecting element 8.

According to the invention:

the first distance D1 is between 150.48 mm and 152.48 mm and is preferably equal to 151.48 mm, the second distance D2 is between 121.81 mm and 123.81 mm and is preferably equal to 122.81 mm, the third distance D3 is between 45.69 mm and 47.69 mm and is preferably equal to 46.69 mm, the fourth distance D4 is between 19.12 mm and 21.12 mm and is preferably equal to 20.12 mm.

It is to emphasize that thanks to the particular above dimensioning of the hinge distances of the articulated quadrilateral of the hinge according to the invention, it obtain an extremely compact hinge with is possible to significantly reduced overall sizes compared to hinges of a similar type known so far, as discussed in more detail below.

Moreover, the particular above dimensioning of the hinge distances of the articulated quadrilateral of the hinge according to the invention also allows to provide empty the hinge for housing inside hinge the a spaces in plurality of additional components, if any, such as: the elastically deformable member 9 which interacts with the connecting element 8, and/or a tube 13 (FIG. 1) for the passage of water and/or cables, and/or a deformable member 14, which interacts with the connecting element 8, adapted to act as a damper, and/or an element 15 (FIG. 1) for adjusting the position of any additional panel 16 (FIG. 2) associated with the closing element 1 of the household appliance, and/or a member 17 (FIG. 1) for adjusting the hinge end-of-stroke.

The particular above dimensioning of the articulated quadrilateral hinge axes of the hinge according to the invention also allows to limit the 90° opening of the closing element of the household appliance (for example the door of a refrigerator if it were installed in a corner of the kitchen) or, at the user's choice, to allow the opening of an angle even greater than 90° (as shown in FIGS. 3 and 4) even in the event that the closing element 1 is associated with an external additional panel 16, as usual in built-in refrigerators (the pieces of cabinetry in which the refrigerator is built-in are schematically shown in FIGS. 2-4 and indicated with references G1, G2, G3). The hinge according to the invention has proved that it possible to reach a maximum opening angle of approximately 106° (FIG. 4). The hinge according to the invention is also advantageous when closed as it allows the closing element 1, and in particular its magnetic gasket 18 (FIG. 2), to approach substantially perpendicular to the front bearing wall 2A (FIG. 2) of the body 2 of the household appliance 3, which prevents sliding of the gasket which compromises its duration and seal.

Figure 1B:
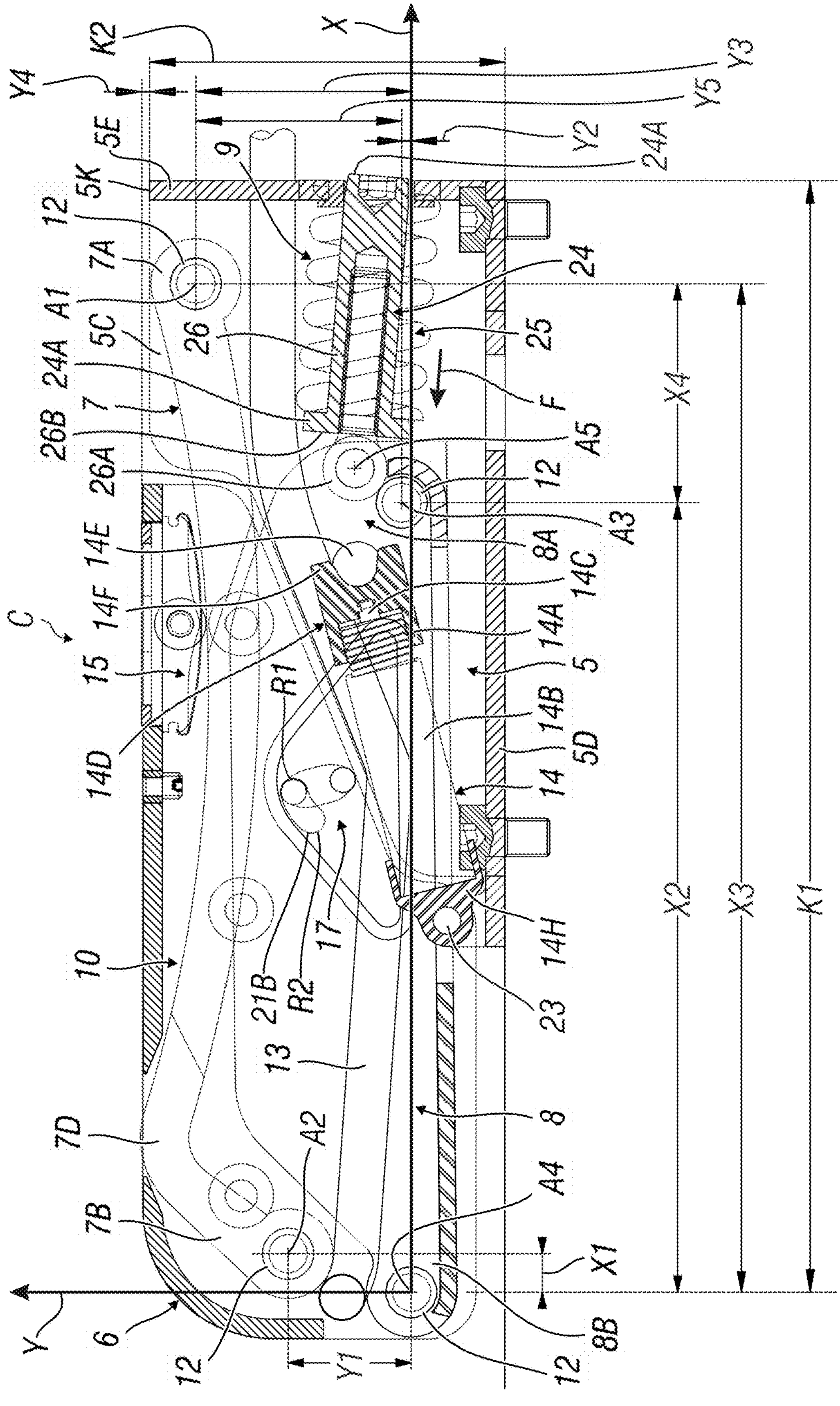

Moreover, preferably, in the closed position C of the articulated quadrilateral system, the origin of a Cartesian axes system XY is fixed in the hinge axis A4 of the second end 8B of the second connecting element 8 (as shown in FIG. 1bis), the horizontal distance X1 between the hinge axes A4 and A2 of the second end 8B of the second connecting element 8, and of the second end 7B of the first connecting element 7, respectively, is between 5.00 mm and 7.00 mm, and is preferably equal to 6.00 mm, the horizontal distance X2 between the hinge axes A4 and A3 of the second and first ends 8B, 8A of the second connecting element 8, respectively, is between 121.80 mm and 123.80 mm, and is preferably equal to 122, 80 mm, the horizontal distance X3 between the hinge axes A4 and A1 of the second end 8B of the second connecting element 8, and of the first end 7A of the first connecting element 7, respectively, is between 155.80 mm and 157.80 mm, and is preferably equal to 156.80 mm, the vertical distance Y1 between the hinge axes A4 and A2 of the second end 8B of the second connecting element 8, and of the second end 7B of the first connecting element 7, respectively, is between 18.20 mm and 20.20 mm, and is preferably equal to 19.20 mm, the vertical distance Y2 between the hinge axes A4 and A3 of the second and first ends 8B, 8A of the second connecting element 8, respectively, is between 0.50 mm and 2.50 mm, and is preferably equal to 1.50 mm, the vertical distance Y3 between the hinge axes A4 and A1 of the second end 8B of the second connecting element 8, and of the first end 7A of the first connecting element 7, respectively, is between 32.50 mm and 34.50 mm, and is preferably equal to 33.50 mm.

The above positioning of the hinge axes with respect to each other contributes to the achievement of the objects of the invention which are: to provide an extremely compact hinge with significantly reduced overall sizes compared to hinges of a similar type known so far, and/or to provide empty spaces in the hinge for housing inside the hinge a plurality of additional components, if any; and it also contributes to the achievement of the aforementioned closing and opening advantages of the closing element of the household appliance.

According to a preferred embodiment of the invention, in the closed position C of the articulated quadrilateral system, thanks to the above particular dimensioning of the hinge distances of the articulated quadrilateral of the hinge according to the invention and/or to the above particular dimensions XY of the hinge axes of the articulated quadrilateral, it is possible to make a hinge with a horizontal dimension K1 (FIG. 1bis) which is between 178 mm and 185 mm and more preferably is equal to approximately 180 mm. This dimension is significantly less than that obtainable with the dimensioning of the hinge distances of the articulated quadrilaterals of the prior art and in particular of those described in U.S. Pat. No. 8,938,854.

According to a preferred embodiment of the invention, in the closed position C of the articulated quadrilateral system, thanks to the above particular dimensioning of the hinge distances of the articulated quadrilateral of the hinge according to the invention and/or to the above particular dimensions XY of the hinge axes of the articulated quadrilateral, it is possible to make a hinge whose vertical dimension K2 (FIG. 1bis) of the first support structure 5 adapted to be constrained to the front bearing structure or wall 2A (FIG. 2) of the body 2 of the household appliance 3 can vary according to the thickness of the closing element 1, constrained to the second support structure 6 of the hinge, the minimum vertical dimension K2' (FIG. 13B), being between 50.20 mm and 52.20 mm, and more preferably being equal to approximately 51.20 mm.

Figure 13A:
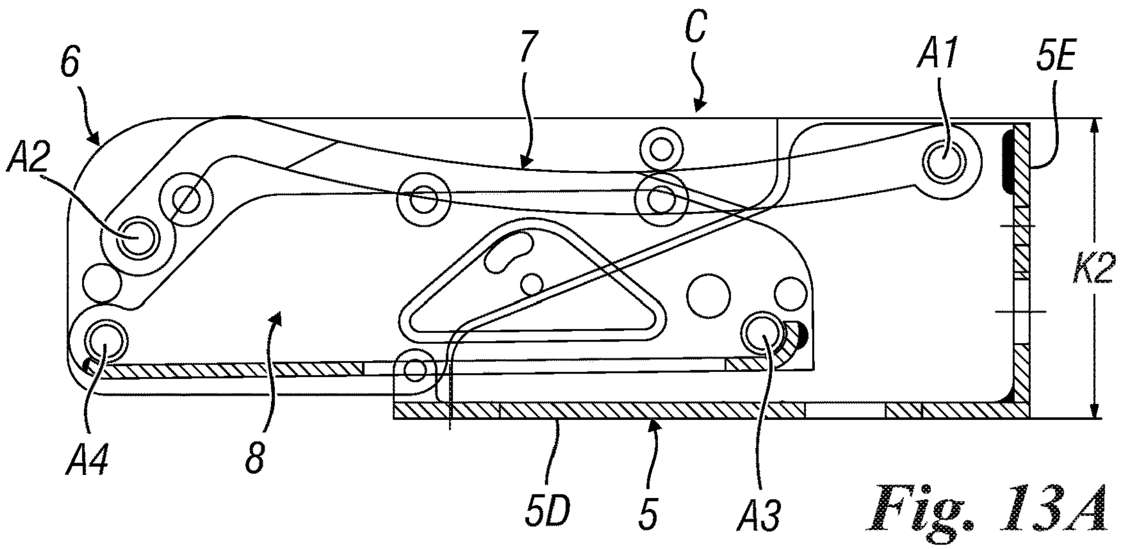
FIGS. 13A-C show a partially sectioned schematic top view of three variants of a hinge according to the invention.
Figure 13B:
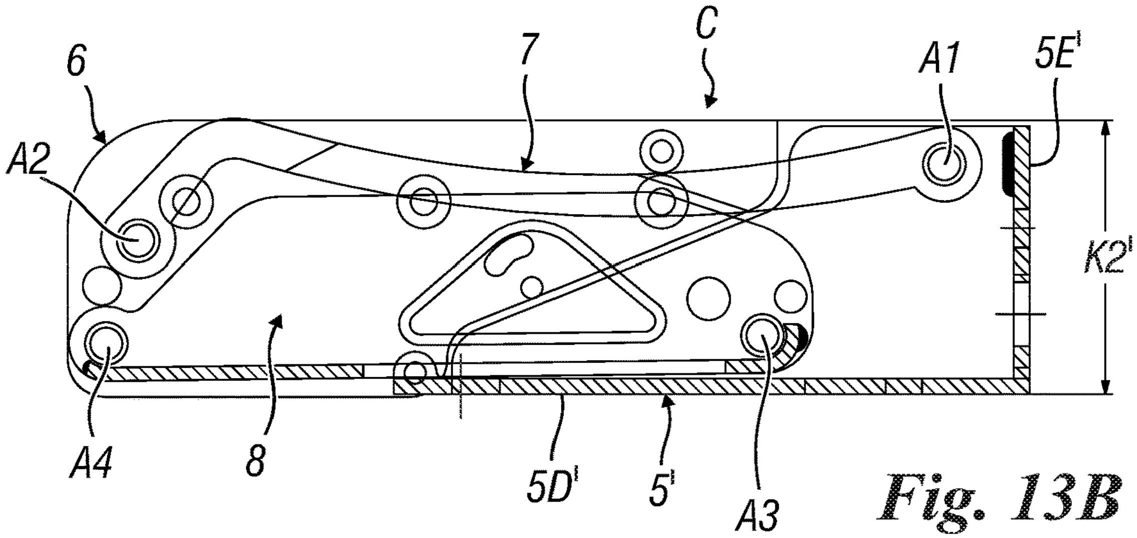
Figure 13C:
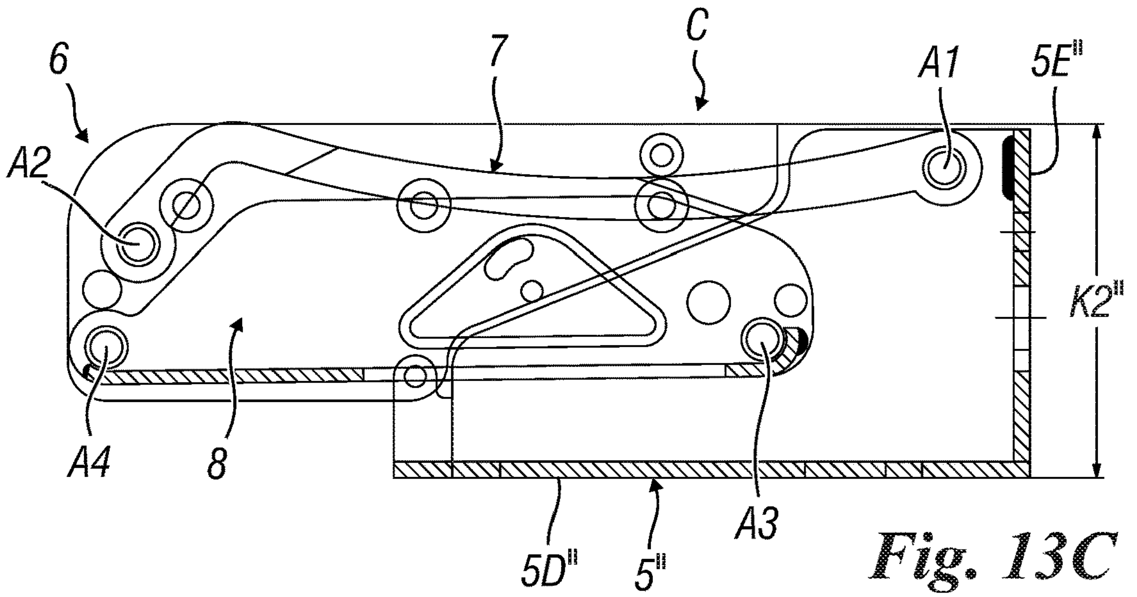

FIGS. 13A-C show the same hinge according to the invention associated with three different first possible support structures 5, 5' and 5" for a hinge according to the invention. The hinge and its first support structure 5 of FIG. 13A is identical to that of FIGS. 1A and 1B, and has a vertical dimension K2 for example equal to approximately 55.20 mm (+/−1 mm), and can for example be used with the household appliance closing elements having thicknesses of 3 inches (7.62 cm).

The hinge and its first support structure 5' of FIG. 13B is identical to that of FIGS. 1A and 1B, but the first support structure 5' has a minimum vertical dimension K2' equal to approximately 51.20 mm (+/−1 mm), and can for example be used with the household appliance closing elements having thicknesses less than 3 inches (7.62 cm), for example having a thickness of 2 inches (5.08 cm).

The hinge and its first support structure 5" of FIG. 13C is identical to that of FIGS. 1A and 1B, but the first support structure 5" has a greater vertical dimension K2", equal to approximately 65.20 mm (+/−1 mm), and can for example be used with the household appliance closing elements having thicknesses greater than 3 inches (7.62 cm), for example having a thickness of 3.5 inches (8.89 cm).

By replacing only the first support element 5, 5, 5', 5", the hinge according to the invention can therefore be associated with closing elements, and in particular with doors of built-in or free-standing refrigerators, even having very reduced thicknesses (for example of 2 inches). It should be noted that in all the variants of the hinge, in the closed position C of the hinge, there is preferably a vertical distance Y4 (FIG. 1B) equal to approximately 1 mm (+/−0.5 mm) between the end 5K (FIG. 1B) of the first structure 5 and the outermost surface of the horizontal wall 6D of the second structure 6, so that the maximum vertical dimension of the hinge is approximately 1 mm greater than the vertical dimension of the first structure 5.

Furthermore, the hinge preferably has the following additional dimensioning:

a first horizontal distance X1 (FIG. 1B) between the rotation axes A4, A2, of the end pairs 7B and 8B which are closer to each other than the first and second connecting elements 7 and 8, a second horizontal distance X4 between the rotation axes A1, A3, of the end pairs 7A and 8A which are further apart from each than the first and second connecting elements 7 and 8, a first vertical distance Y1 between the rotation axes A4, A2, of the end pairs 7B and 8B which are closer to each other than the first and second connecting elements 7 and 8, a second vertical distance Y5 between the rotation axes A1, A3, of the end pairs 7A and 8A which are further apart from each other than the first and second connecting elements 7 and 8;

Wherein for example:

said first horizontal distance X1 is between 5.4 mm and 6.6 mm and is preferably equal to 6 mm, said second horizontal distance X4 is between 30.6 mm and 37.4 mm and is preferably equal to 34 mm, said first vertical distance Y1 is between 17.28 mm and 21.12 mm and is preferably equal to 19.20 mm, said second vertical distance Y5 is between 28.80 mm and 35.20 mm and is preferably equal to 32 mm.

Advantageously, the first 7 and second 8 connecting elements have a first and a second connecting rod 19 (FIG. 9), 20 (FIG. 8) having mutually different shapes and shaped so that during the movement of the hinge the first connecting rod 19 is at least partially housed inside the second connecting rod 20.

The first connecting rod 19 has a substantially flat shape with an arched profile which provides, going from the end portion 7A to the other 7B, a first slightly arched part 7C with a first concavity, facing the outside of the hinge, and a second part 7D which provides a cranked bend with a concavity facing the inside of the hinge and opposite to that of the arched part 7C.

The first connecting rod has at an upper and lower surface thereof recessed portions 7E, 7F which reduce its overall height and allow, as better illustrated below, the second connecting rod 8 to overlap the first connecting rod 7 during movement of the hinge (FIG. 3). The seats 7G for the hinge elements 12 of the articulated quadrilateral system are provided at the ends of the connecting rod 19.

The second connecting rod 20 comprises an upper wall 20A (FIG. 8) and a lower wall 20B, substantially flat and parallel to each other and connected to each other by a vertical part 20C, which define a body with a 90° reversed U-shaped cross-section. The seats 8G (FIG. 8A) for the hinge elements 12 (FIG. 8C) of the articulated quadrilateral system are provided in the end portions 8A and 8B of the two parallel walls 20A-B and at the connecting wall 20C.

The shape of the connecting rod 20 simplifies its production because it makes it possible to produce it for example by bending a sheared sheet metal.

The shape of the connecting rod makes it very stable and resistant to bending.

The two parallel walls 20A-B are shaped and sized so that during the rotation movement of the connecting rods 19 and 20, said walls would always at least partially close the open space that is created between a connecting rod and the other so as to prevent a user of the household appliance from inserting a finger between said parts of the hinge i.e. that the hinge is designed to overcome the so-called test finger test. Thanks to the parallel walls 20A-B hinge plastic covers of the connecting rods, i.e. covers that are unsightly and of dubious effectiveness with respect to the test finger test, can be avoided.

Advantageously, the two parallel walls 20A-B of the connecting rod 20 are shaped and sized so that one of their portion partly overlaps the connecting rod 19 (as shown in FIGS. 1, 3, 4). For this purpose, the connecting rod 19 has recessed portions 7E, 7F over which a portion T (FIG. 8A) of the parallel walls 20A-B can pass. Advantageously, a part of the parallel walls 20A-B of the connecting rod 20 always overlaps a corresponding part of the connecting rod 19, both when the hinge is closed (FIG. 1) and when it is fully open (FIGS. 3 and 4).

Advantageously the height H3 (FIG. 8B) between the opposite faces of the two parallel walls 20A-B is greater than the thickness H4 (FIG. 9B) of the recessed portions 7E, 7F of the connecting rod 19.

Advantageously, the two parallel walls 20A-B have an end portion 8B which is closer to the support structure 6, which has a rounded shape and protruding with respect to the main shape of the parallel walls 20A-B. Advantageously, the protruding end portion 8B is sized and shaped so as to be at least partially housed in the concavity of a cranked part 7D of the connecting element 19 when the hinge is in a maximum opening position (FIGS. 3 and 4), for this purpose, preferably, the radius of the curvature of this cranked part is equal to or greater than the radius of the curvature of this protruding and rounded part 8B.

The two parallel walls 20A-B both have a recessed portion 20D, E, for example drawn and triangular in shape, adapted to house the member 17 for adjusting the end position of the hinge rotation.

The member 17 provides, for example, a U-shaped element (FIG. 8C), in which the upper part 17A of the U is adapted to be housed in the upper recessed portion 20D, while the lower ends 17B are housed and constrained in the lower recessed portion 20E. The legs 17C and 17D of the U of the member 17 pass one into circular and coaxial through holes 21A (FIG. 8A) and one into overlapping slot holes 21B. The slot holes 21B are sized and shaped so as to be able to adjust the hinge maximum opening to a negligibly angular value, for example a hinge maximum opening at 90° or an opening at 105°.

For example, if the leg 17D is constrained to the end R1 (FIG. 8A) of the slot 21B, the hinge will be able to rotate angularly at most up to an angle of 90° (FIG. 3); if, instead, the leg 17D is rigidly constrained to the other end R2 (FIG. 8A) of the slot 21B the hinge will be able to rotate angularly at most up to an angle of 105° (FIG. 4).

Figure 8A:
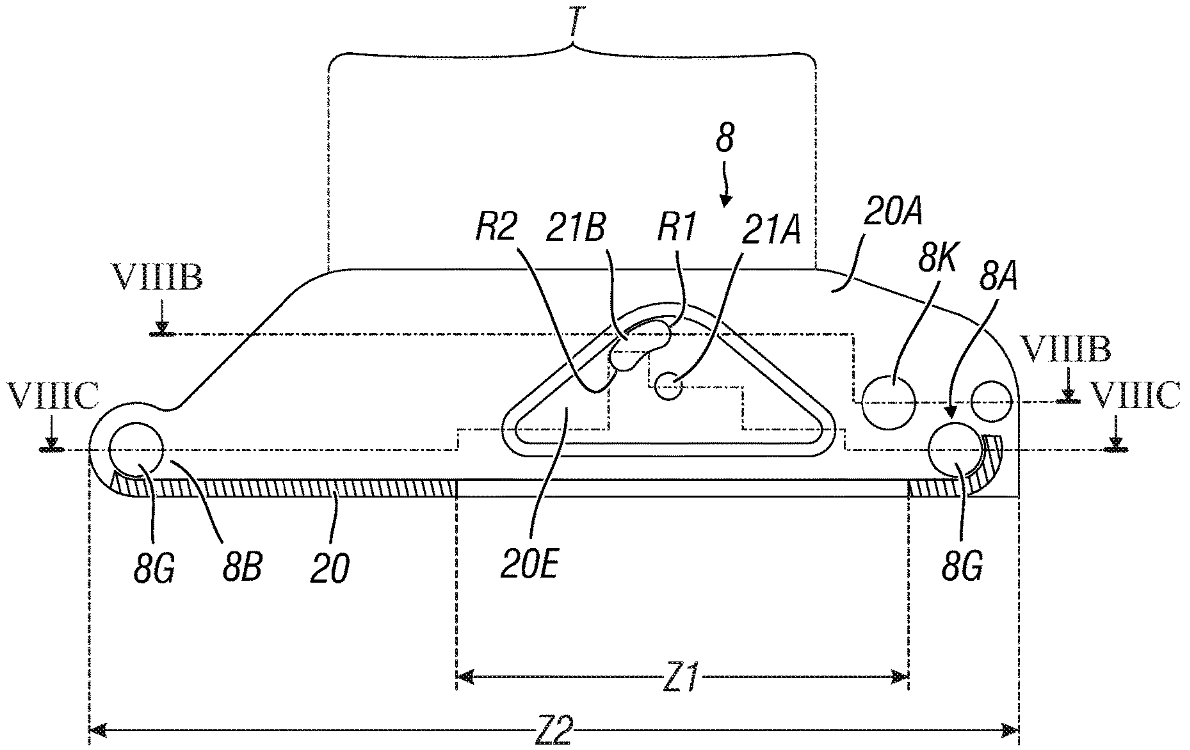
FIGS. 8A-D are partially sectioned schematic top views of a third component of the hinge and two sectional views (the sections referred to in FIGS. 8B and 8C are taken according to lines VIIIB and VIIIC of FIG. 8A, respectively)
Figure 8B:
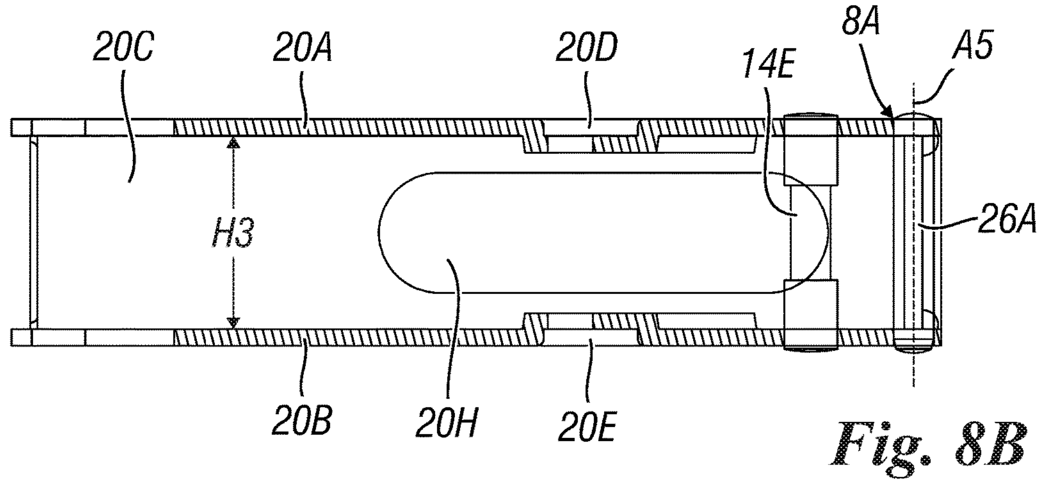
Figure 8C:
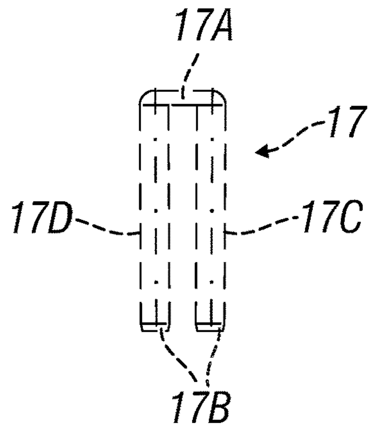
Figure 8C:
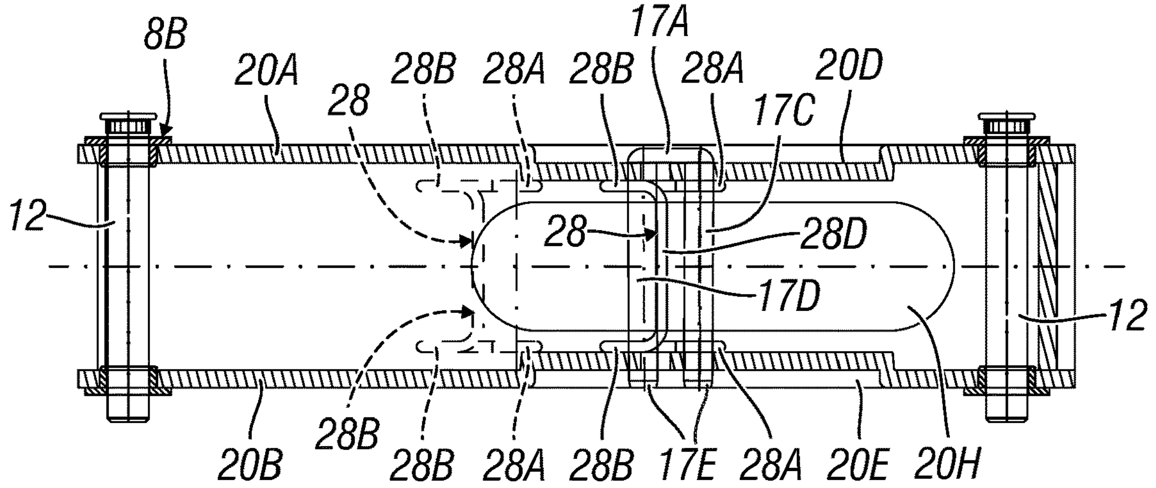
Figure 8D:
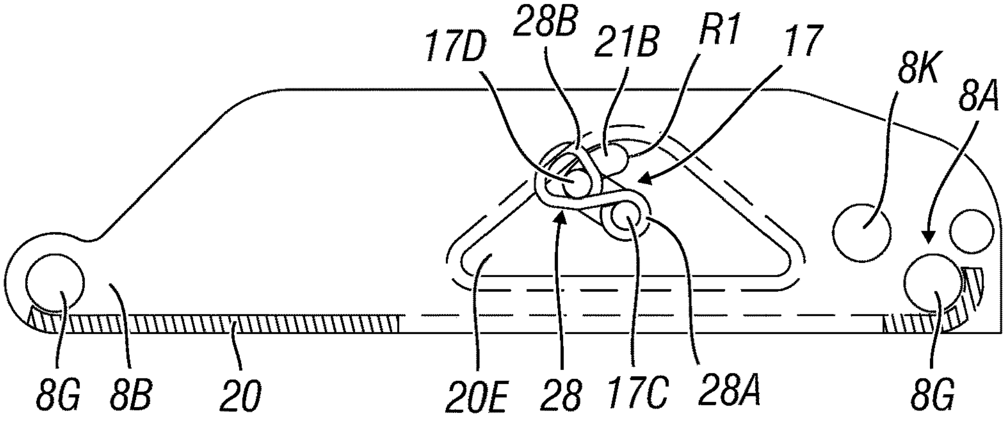
Figure 9A:
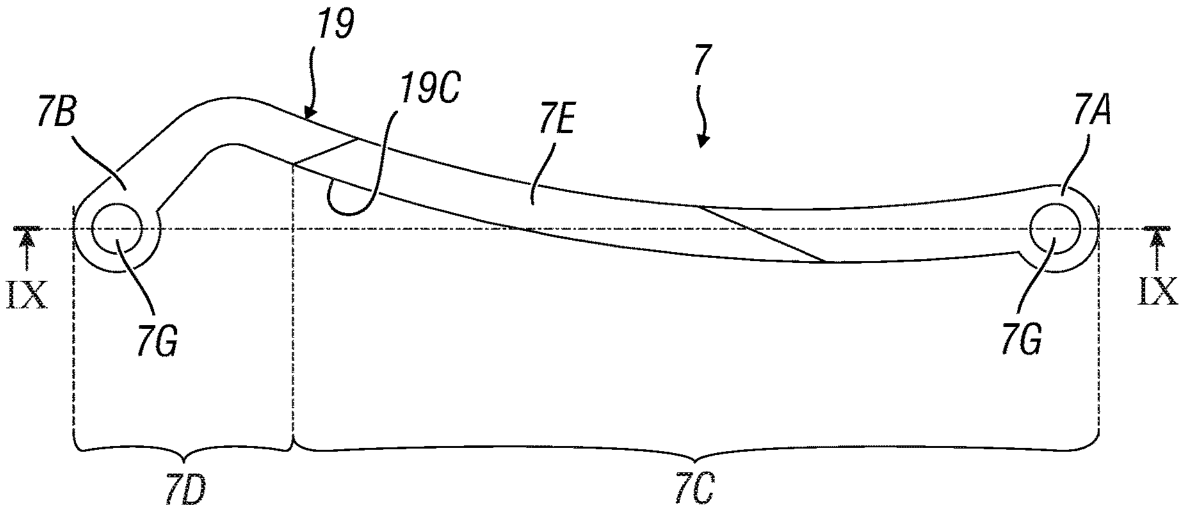
FIGS. 9A-B are a schematic top view of a fourth component of the hinge and a sectional view taken along line IX of FIG. 9A.
Figure 9B:
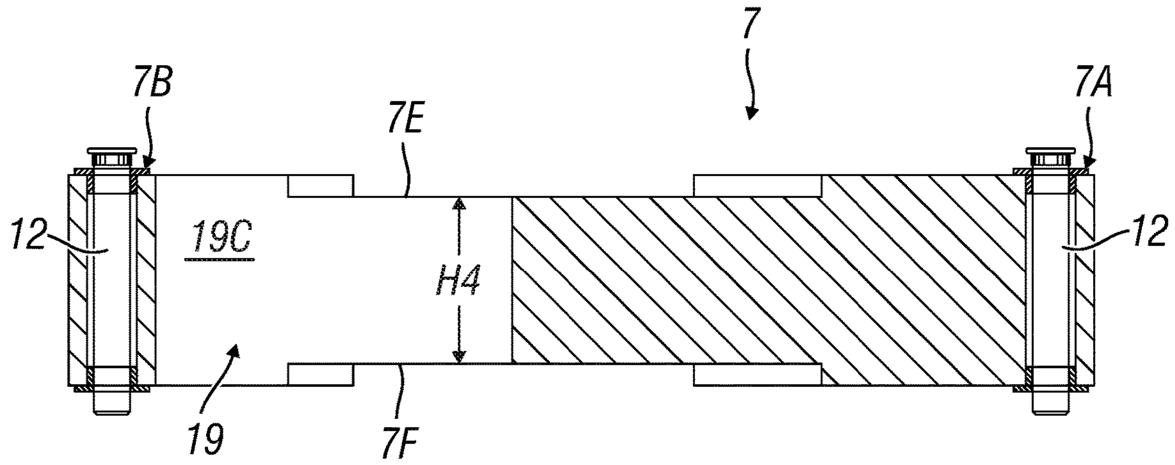

In FIG. 8C the member 17 is shown in two positions: it is represented by a dotted line before being inserted in the holes 21A and 21B, and is represented by a solid line when it is associated with the connecting rod 20.

The shape and dimensions of the slot 21B therefore determine the end-of-stroke of the hinge rotation and allow to choose to limit the opening of the hinge to 90° (for example when the refrigerator is positioned in a corner of the kitchen and the aim is to prevent the door from coming into contact with a wall M which delimits said corner of the kitchen) or allows opening up to 105° in the most usual situations when the refrigerator door is free to roto-translate up to its maximum opening.

The member 17 adapted to adjust the end position of the hinge rotation also has an elastically deformable element 28 (FIGS. 8C, 8E) adapted to make the stroke of the connecting rod 19 more gradual and “softer” in the desired end-of-stroke position.

The deformable element 28 can be for example an elastic tubular element 28Z (FIG. 8E) fitted on a leg 17D or, as shown in FIG. 8C, it can comprise a spring having, for example, an upper and a lower portion having a double-eight shape, connected to each other by a vertical portion 28D of the spring (FIG. 8C). Each eight-shaped portion has a loop 28A rigidly constrained to the leg 17C (in which the leg passes through the loop 28A) and the other penetrated loop 28B and in which the other leg 17D of the U-shaped element 17 is housed with a clearance, and against which the connecting rod 19 abuts in the desired end-of-stroke position for the hinge.

Figure 8E:
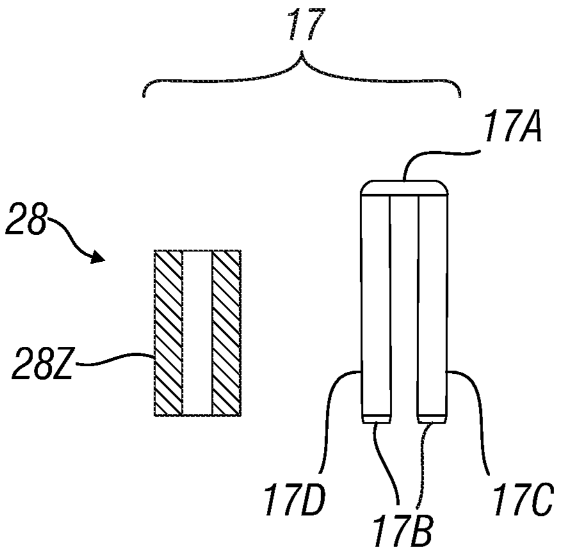
FIG. 8E is a variant of a component of an end-of-stroke member of FIGS. 8A-D.

In the variant of the end-of-stroke member of FIG. 8E wherein the tubular element 28Z is present instead of the spring, this tubular element performs the same function as the loop 28B, and the connecting rod 19 in the desired end-of-stroke position for the hinge abuts against this tubular element 28Z.

Figure 10A:
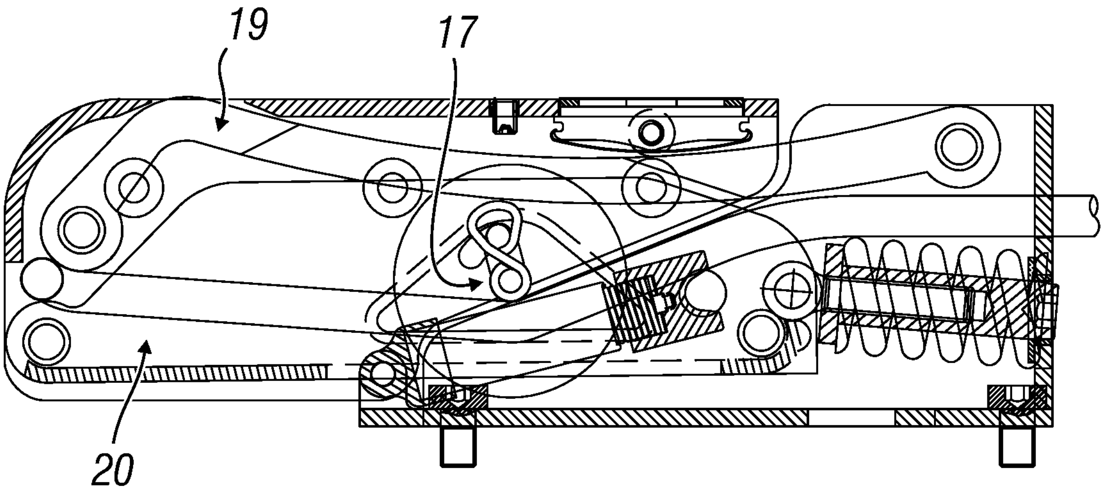
FIGS. 10A-B, 11A-B, 12A-B show the hinge and one member 17 thereof for adjusting the end-of-stroke of the hinge in different possible positions of use.
Figure 10B:
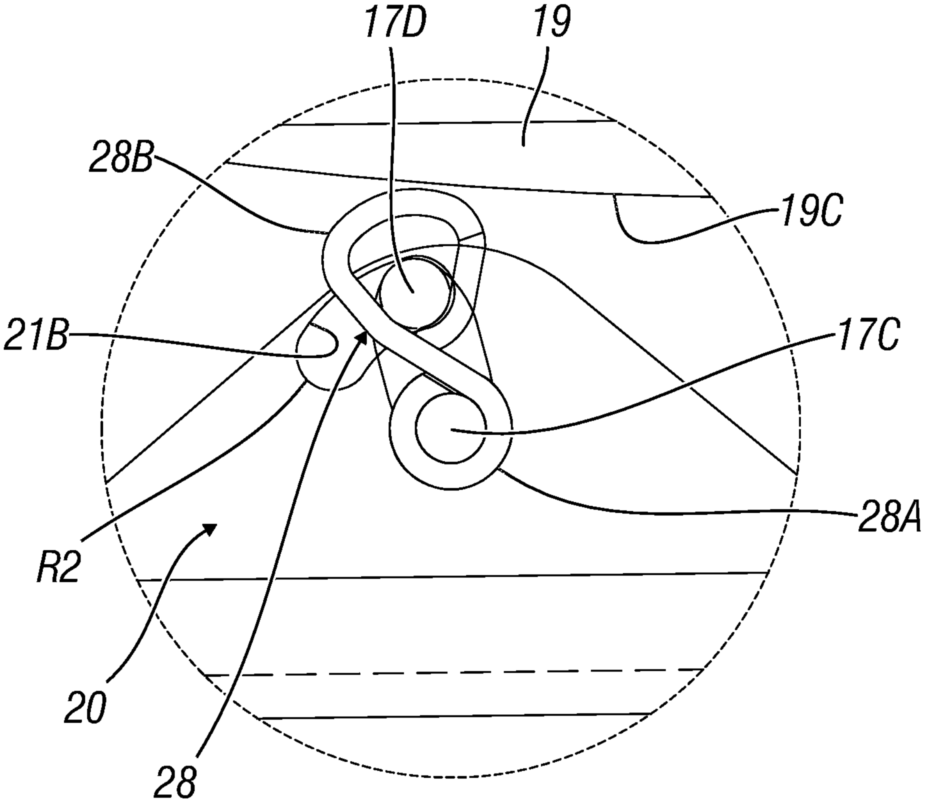
Figure 11A:
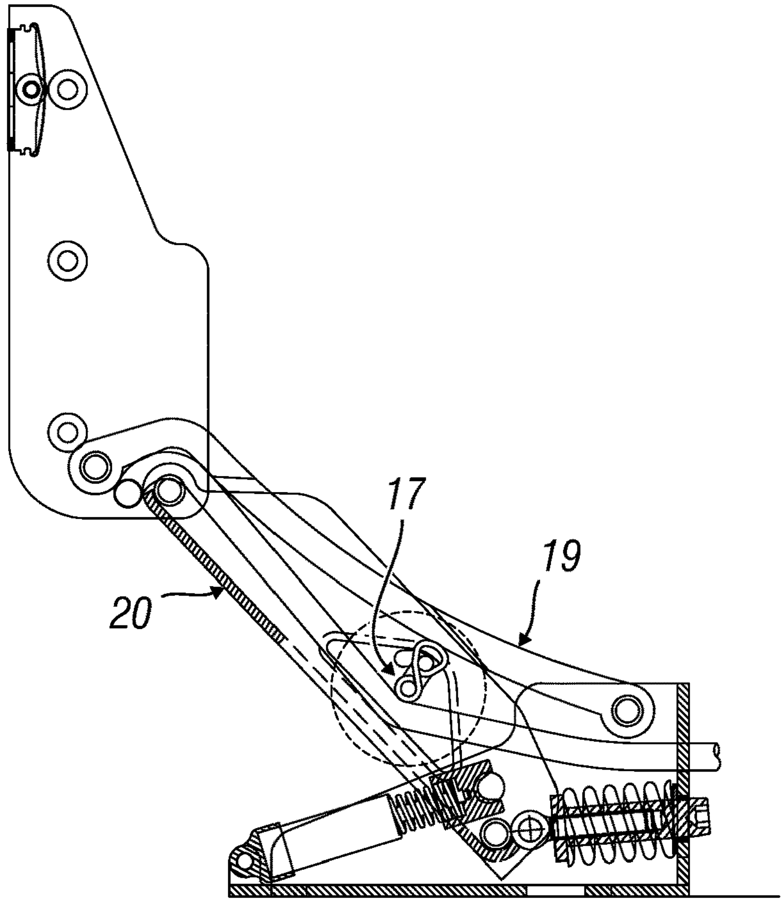
Figure 11B:
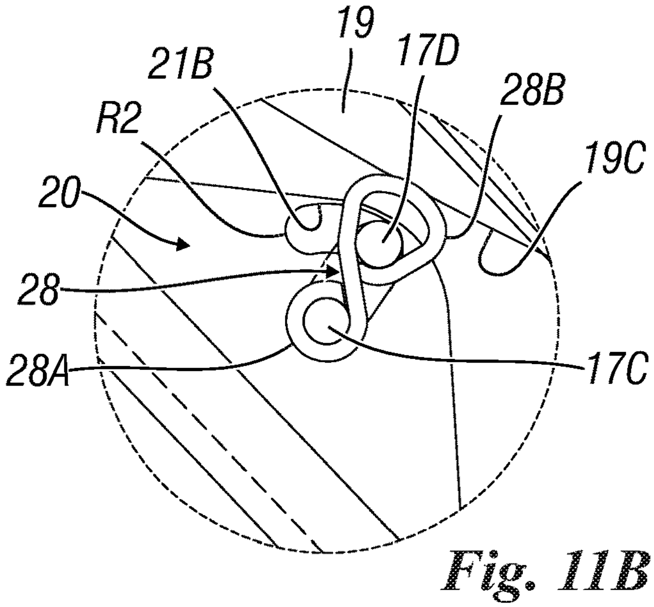
Figure 12A:
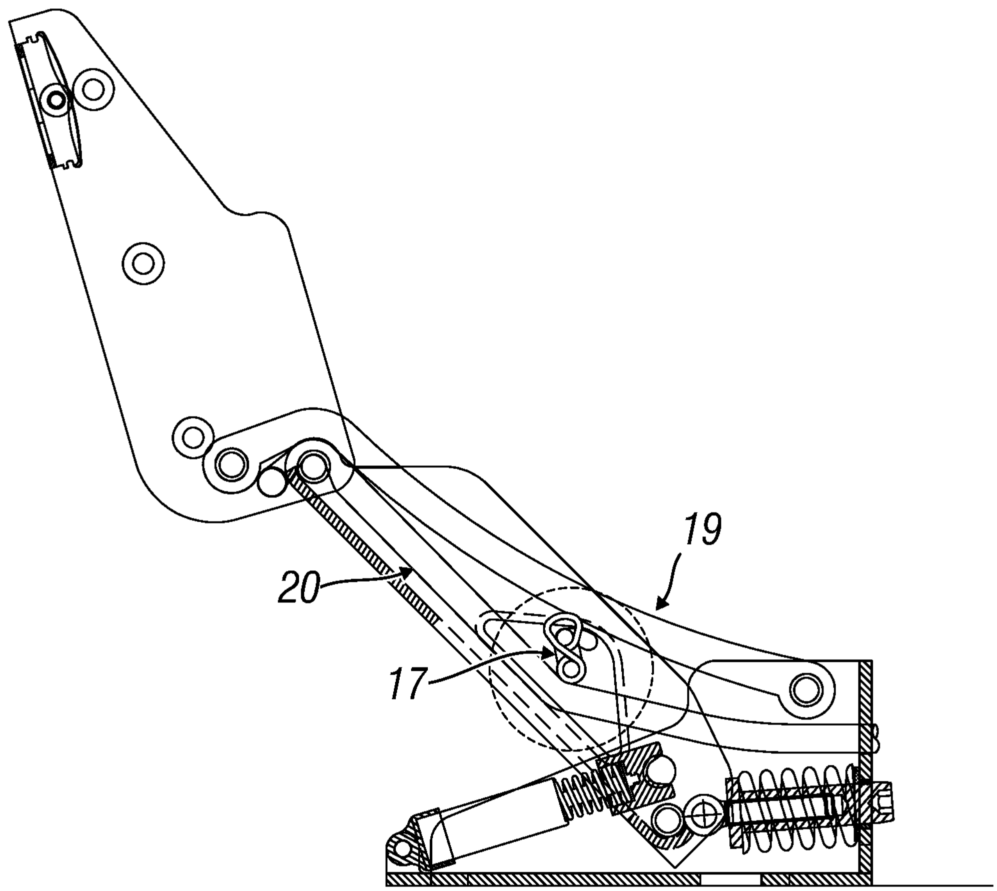
Figure 12B:
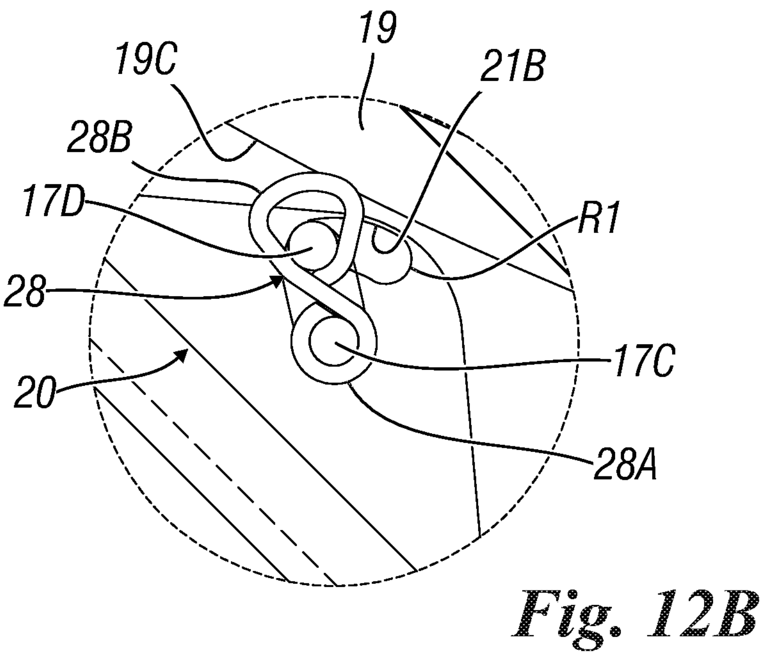

In more detail, as shown in FIGS. 10-12, a user moves (for example using a screwdriver) the end-of-stroke member 17 to the maximum desired opening for the refrigerator door, for example in FIGS. 10-12 the member 17 is adjusted to a maximum opening of 90°, and the leg 17D is moved to the end R1 (FIG. 8A) of the slot 21B. In this situation, when the hinge s closed (FIG. 10A) the elastically deformable element 28 of the member 17 protrudes from the connecting rod 20 but is not in contact with the connecting rod 19, i.e., in more detail, the loop 28B or the tubular element 28Z fitted on the leg 17D which passes into the slots 21B does not come into contact with the flat face 19C of the connecting rod 19 facing the connecting rod 20.

On the other hand, when the hinge is rotated by 90° (FIG. 11) the elastically deformable element 28 of the member 17 protrudes from the connecting rod 20 and is also in contact with the connecting rod 19, that is, in more detail, the loop 28B or the tubular element 28Z fitted on the leg 17D which passes into the slots 21B comes into contact with the flat face 19C of the connecting rod 19, facing towards the connecting rod 20, and blocks the stroke of the hinge and hence of the door associated therewith.

FIG. 12 show the situation in which the end-of-stroke member 17 is moved to the maximum possible opening for the hinge, in which the leg 17D is moved to the end R2 (FIG. 8A) of the slot 21B. In this situation, too, when the hinge is closed the elastically deformable element 28 of the member 17 protrudes from the connecting rod 20 but is not in contact with the connecting rod 19, while when the hinge is fully open (FIG. 12) elastically deformable element 28 of the member 17 protrudes from the connecting rod 20 and is also in contact with the connecting rod 19.

In any case, the stop is elastic and avoids rigid impacts. It should be noted that the member 17 adapted to adjust the end position of the hinge rotation, allows to prevent the connecting elements 7 and 8, and in particular their extreme portions 7B and 8B from coming into contact with each other when the hinge is fully open, and over the time damaging said connecting elements and/or modifying the optimal functioning of the hinge. By preventing the end portions 7B and 8B of the connecting elements 7 and 8 from coming into contact with each other, it is also avoided to throttle the tube 13 for the passage of water and/or cables (as shown for example in FIG. 3).

As shown in FIG. 8, the wall 20C of the connecting rod 20 has a through window 20H for the passage of a second deformable member 14 which interacts with the connecting element 8, described in detail below.

Figure 6B:
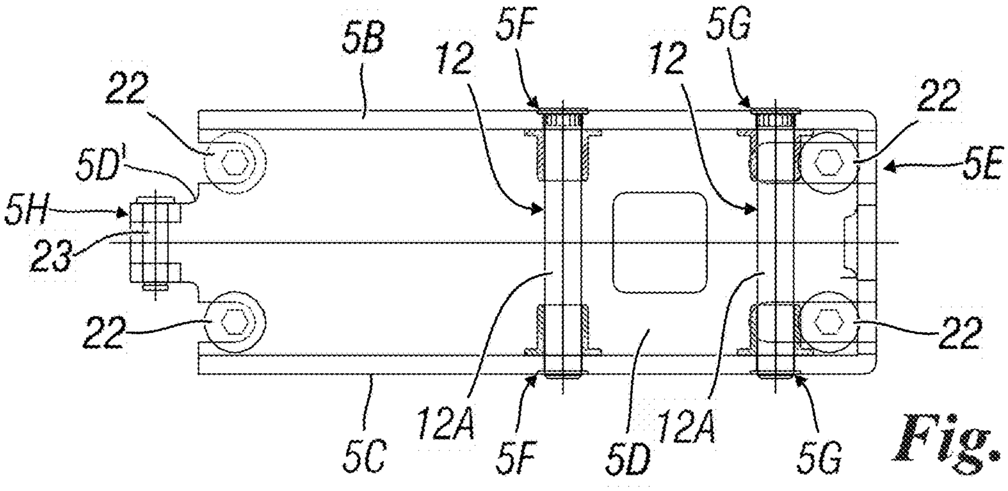
Figure 6C:
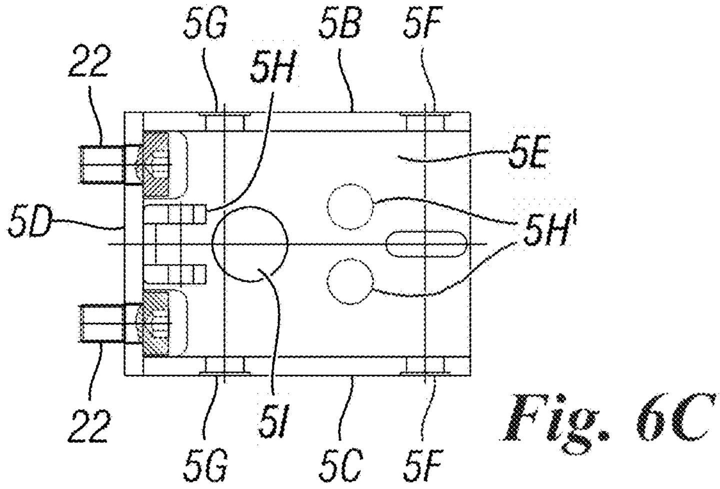

The first support structure 5 (FIGS. 1 and 6) adapted to be constrained to a front bearing structure or wall 2A (FIG. 2) of the body 2 of the household appliance 3, comprises an upper wall 5B and a lower wall 5C, arranged parallel to each other, and two side walls 5D and 5E, these walls form a partially closed box-like body, shaped and sized so as to be able to partially house the connecting elements 7 and 8 (which are constrained thereto by means of the hinge elements 12), and the first 9 and second 14 deformable elements (also constrained to the support structure 5 as illustrated below).

The seats 5G, 5F (FIG. 6A, 6B) for the hinge elements 12 (FIG. 6B) of the articulated quadrilateral system are provided in the portions 5A of the two parallel walls 5B, 5C and at the connecting walls 5D and 5E.

The side wall 5D has usual holes and/or slots for the passage of screws 22 (FIG. 6A-C) to stably constrain, as usual by those skilled in the art, a support structure 5 to a front bearing structure or wall 2A (FIG. 2) of the body 2 of the household appliance 3.

The side wall 5D adapted to be positioned parallel to the front bearing structure or wall 2A (FIG. 2) of the body 2 of the household appliance 3 comprises at the free end 5D' thereof (FIG. 6B) a central extension 5H adapted to house a hinge element 23 (FIG. 6B) of the second deformable element 14 (FIG. 1). The other side wall 5E adapted to be positioned perpendicular to the front bearing structure or wall 2A (FIG. 2) of the body 2 of the household appliance 3 comprises two first through holes 5H' (FIG. 6C) for the passage of one or more tubes 13 (FIG. 1) for the passage of water or cables, and a further through hole 51 (FIG. 6C) adapted to house the head 24A (FIG. 1) of a tubular element 24 for adjusting the first elastic deformation member 9 (described in detail below).

The second support structure 6 (FIGS. 1 and 7) adapted to be constrained to the closing element 1 (FIG. 2) of the household appliance 3, comprises an upper wall 6B, a lower wall 6C, arranged parallel to each other, and two side walls 6D and 6E, these walls form a partially closed box-like body, shaped and sized so as to be able to partially house the connecting elements 7 and 8 (which are constrained thereto by means of the hinge elements 12).

The seats 6G, 6F (FIGS. 7A, 7C) for the hinge elements 12 (FIG. 7C) of the articulated quadrilateral system are provided in the portions 6A of the two parallel walls 6B, 6C and at the connecting walls 6D and 6E.

The lower side wall 6C has usual holes and/or slots for the passage of screws 22 (FIGS. 7A, 7B) to stably constrain, as usual for those skilled in the art, the support structure 6 to the closing element 1 (FIG. 2) of the household appliance 3, the other wall 6B, parallel to the wall 6C, has through holes 22L (FIG. 7B) in positions opposite to those where the holes for the screws 22 are provided (FIG. 7B) to allow access to the screws 22 of the other wall 6C. The wall 6C also has a through hole 6H for the passage of the pipe 13 (FIG. 1) for water and/or cables. The side wall 6D adapted to be positioned parallel to the closing element 1 (FIG. 2) of the household appliance 3 comprises a through window 6I adapted to be at least partially penetrated by the crank 7D of the connecting rod 19 of the connecting element 7 (as shown in FIG. 1) when the hinge is in the closed position (FIG. 1), so as to contain the overall dimensions of the hinge. The wall 6D also comprises a further window 6J (FIGS. 7B, 7D) adapted to house the member 15 for adjusting the panel 16 when this is constrained to the closing element 1 of the household appliance 13.

Preferably, the other side wall 6E adapted to be positioned perpendicular to the closing element 1 of the household appliance has a length L1 (FIG. 7A) less than the length L2 of the parallel walls 6B, 6C, for example L1 is equal to approximately ⅔ of L2, with the hole 6G for the hinge element 12 of the end portion 8B of the connection element 8 which is provided in the portion of the parallel walls 6B, 6C in which the side wall 6E does not also extend, so that this side wall 6E does not interfere with the rotation of said end portion 8B of the connecting element (as shown in FIGS. 3 and 4) when the hinge is moved.

Preferably the two support structures 5 and 6 when the hinge is closed (FIG. 1) form a substantially parallelepiped body divided into two parts and with the connecting elements 7, 8 which are substantially housed inside the support structures 5 and 6, between the respective walls 5B-5E and 6B-6E.

It is to emphasize that preferably in the variants of the hinge, in the closed position C of the hinge, there is a vertical distance Y4 (FIG. 1B) equal to approximately 1 mm (+/−0.5 mm) between the end 5K (FIG. 1B) of the first structure 5 and the outermost surface of the horizontal wall 6D of the second structure 6, so that the maximum vertical dimension of the hinge is approximately 1 mm greater than the vertical dimension of the first structure 5.

According to the invention, the first elastically deformable member 9 comprises a helical spring 25 (FIG. 1), which is connected to and acts only on one of said two connecting elements, preferably the shorter one 8 and closer to the opening 4 of the household appliance 3. The spring 25 is adapted to exert a force F (FIG. 1) that pushes the connecting element 8 towards the closure of the household appliance door at least in a range between 30° and 0°, i.e. in the section where the door 1 is rotated by 30° with respect to its first closing operating position C (FIG. 1).

More particularly, as can be seen in FIG. 1, the helical spring 25 is fitted on a support element 26 which has a first end connected to the end portion 8A of the first connecting element 8 at and slightly above the hinge axis A3 of said connecting rod 8, i.e. in an eccentric position with respect to the hinge pin of the connecting rod 8 by means of a pin 26A (FIG. 8B) with a hinge axis A5 (FIG. 1 and FIG. 8) or a similar connecting element for example of the cam type.

Preferably, the two connecting elements 8 and 7 have mutually different lengths and the support element 26 for the helical spring 25 is hinged to the shorter connecting element 8, i.e. to that nearer to the opening 4 of the body 2 of the household appliance 3.

In this way, the elastically deformable member 9, and in particular its spring 25, can be housed substantially within the support structure 5, and preferably substantially in the space comprised between two hinge pins 12 of the connecting elements 7 and 8 constrained to said structure 8 which houses the spring. In this way, the spring 25 may have a length substantially equal to or slightly less than the distance D3 between the hinge axes A3 and A1 of the two connecting elements 8 and 7 connected to the support structure 5.

The support element 26 has along its outer surface a thread 26B which engages a tubular element 24, on which the spring is fitted, and having an abutment 24A for one end of the spring.

The other end of the spring abuts against an inner face of the wall 5E of the first support structure 5.

The tubular element 24 has its other end 24A (FIG. 1) passing through a hole provided in the wall 5E of the support element 55 and substantially flush or partially protruding for example by a millimetre from the external face of said wall 5E and said hole. The end 24A is shaped so that a tool, for example a key or a screwdriver, or an Allen key can be inserted therein so that it can rotate the tubular element 24 and change its position with respect to the support element 26, and consequently varying the force F exerted by the spring upon the connecting element 8.

This conformation of the end 24A of the tubular element 24 reduces the external dimension of the member for adjusting the force exerted by the spring.

It is to emphasize that, thanks to the fact that the spring 25 is connected to the connecting element 8 having a lesser length, it is possible to restrict the compression movement of the spring to a 25-30% of its length at rest and then to increase the period of time in which the spring works efficiently and constantly (i.e. to increase the useful life cycle of the spring).

It is to emphasize that the force F that the spring 25 exerts on the connecting element 8 increases gradually up to his maximum, for a first angular variation of said element between 0 and an angle less than 80°. After said angle the connecting element 8 reverses the rotation and the spring gradually begins to decompress pushing the support structure 6 towards the open position P2, P3 (FIGS. 3, 4).

In other words, thanks to the particular dimensioning of the articulated quadrilateral the spring 25 exerts on the connecting element 8, closer to the household appliance, (and more generally on the hinge), a force which initially facilitates the closure of the hinge, i.e. is such that the door 1 of the household appliance 3 is pushed closed against the body of the household appliance.

Preferably the spring 25 is adapted to generate a force F of approximately 800N when the hinge is in the closed position C (FIG. 1), said force is sufficient to ensure that the closing element 1, i.e. for example the refrigerator door, is firmly in contact with the edge 2A of the refrigerator body when the hinge is closed (FIG. 1); in said situation the refrigerator may no longer need a magnetic gasket between the door said edge which ensures the contact to one another, as the force exerted by the spring on the hinge and by the latter on the door 1 would be sufficient to keep it in contact with the refrigerator body.

It is to emphasize the fact that the spring 25 is connected to the connecting element 8, at its hinge pin closer to the opening 2A of the refrigerator 1, and so as to be always positioned outside connecting element during the movement of the latter, this allows to always, i.e. in any operating position of the hinge, have a free space S between the two connecting elements 7 and 8, wherein it is possible to insert a tube 13, for example for the passage of water or electric cables, which connects the inside of the refrigerator with the door 1 of the same.

Advantageously, if the hinge must not envisage the tube 13, it can reach a maximum opening position P3 (FIG. 4) having a rotation angle 21 equal to or greater than 110°, and with a closing element comprising, for example, the door 16A of a refrigerator and a panel 16 of a furniture element and the hinges according to the invention, having a total width L1 (FIG. 4) equal to 3 inches.

Preferably the hinge means 12 for hinging the end portions 8A, 8B, 7A, 74B of the first and second connecting elements 7 and 8, to the first and second portions 5A and 6A of the support structures 5 and 6, provide pins (shown for example in FIGS. 7C and 6B) passing into cylindrical seats and/or through holes provided in the end portions of the connecting elements 7 and 8 and in holes formed in the parallel and overlapped walls 5B, 50, 6B, 6C of the support structures 5 and 6.

The hinge can also provide a second deformable member 14 which interacts with the connecting element 8, adapted to act as a damper and graduate the force F exerted by the first deformable member 9 during the hinge closing phase, i.e. when the closing element 1 of the household appliance 3 is desired to be brought from an open to a closed position.

The second deformable member 14 ensures, for example, a slow and gradual closing of the door of a refrigerator and prevents the door from banging against the body of the refrigerator.

The second deformable member 14 is, for example, a usual member of a single-acting damper type, adapted to act only when the door closes and which does not act when the door is opened. Preferably the deformable member 14 is a hydraulic damper, i.e. a dashpot.

The second deformable member 14 comprises, for example, a piston movable in a cylinder 14B, and having an end 14C constrained to a terminal 14D, having a fork-type head 14F so as to be easily fitted on and to be able to rotate with respect to a fixed pin 14E constrained in holes 8K (FIG. 8B) of the second connecting element 8. The cylinder 14B has an end part housed in an end element 14H which is in turn hinged and free to rotate around a pin 23 (FIG. 6B) constrained to the central extension 5H (FIG. 6B) of the first support element 5. A spring 14A is provided on the piston rod that protrudes from the cylinder 14B, which facilitates the movement of the piston when the hinge passes from a closed position to an open position.

It is to emphasize that the tubular body 14B, during the movement of the can move and passes through the window 20H (FIG. 8B) of the second connecting element 8, which is suitably shaped and sized for this purpose. Said window 20H can for example have a length Z1 (FIG. 8A) between 30% and 80% of the overall length Z2 of the connecting element 8, preferably equal to approximately 40/45%.

The hinge also advantageously provides the member 15 for adjusting the panel 16 with respect to the closing element 1 of the household appliance 3; this adjustment member 15 is of a known type and will therefore not be described in detail below, it is preferably of the type described in the U.S. Pat. No. 6,079,64, by the same applicant of the present application, the content of which is to be understood as included in the present text.

Figure 5A:
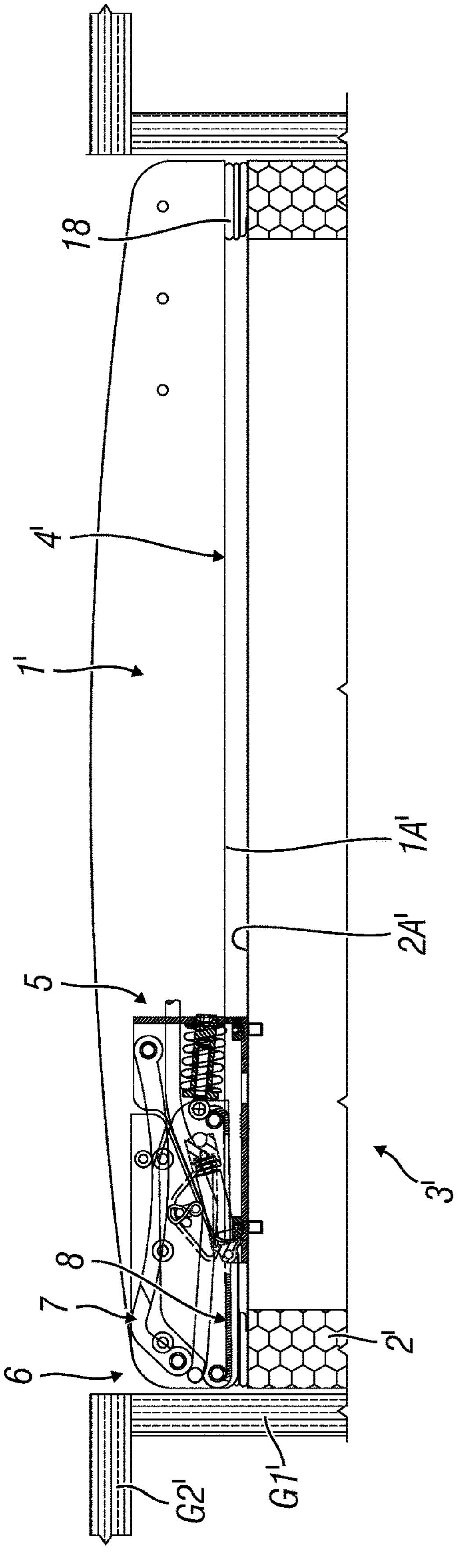
Figure 5B:
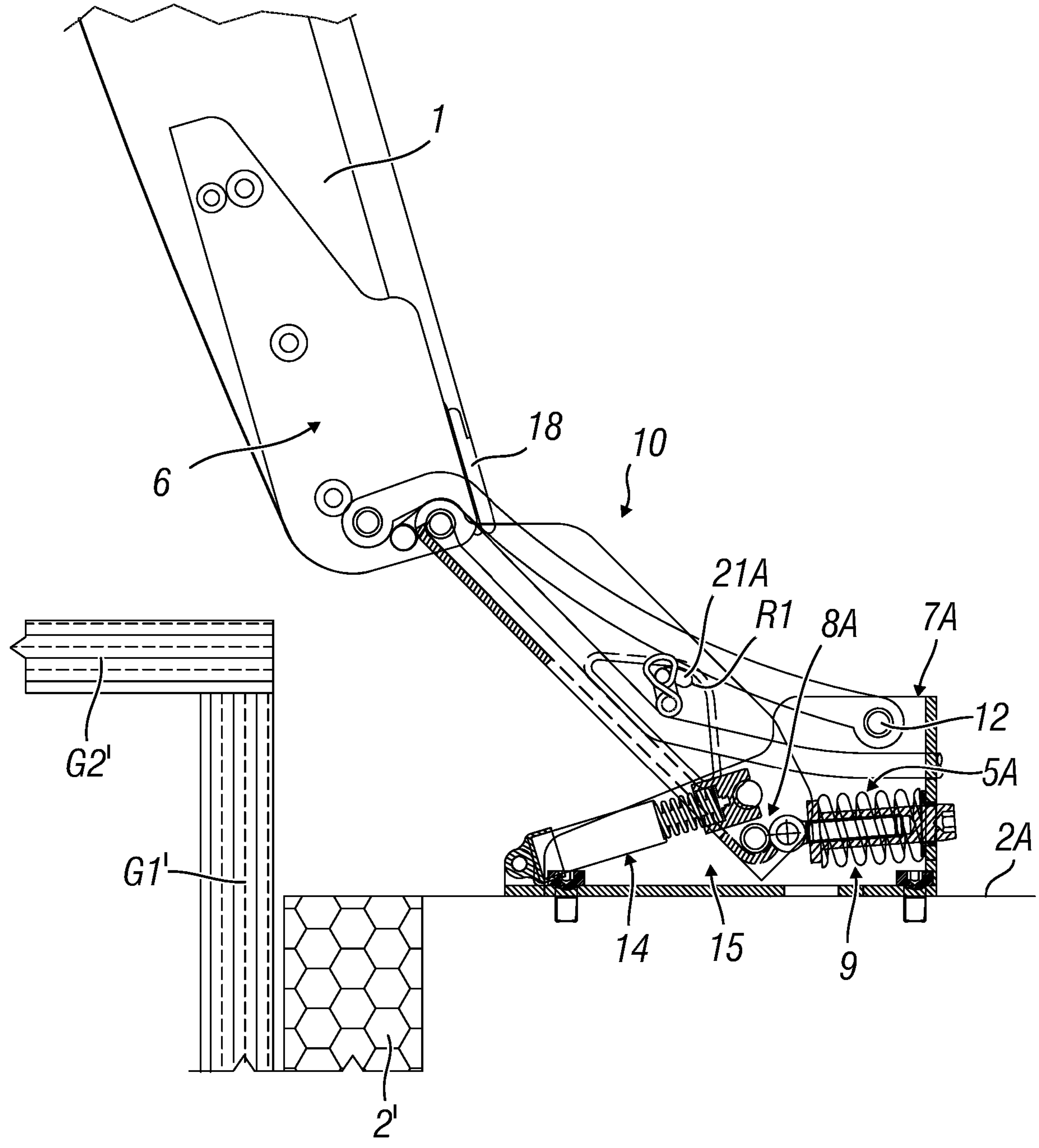
Figure 5C:
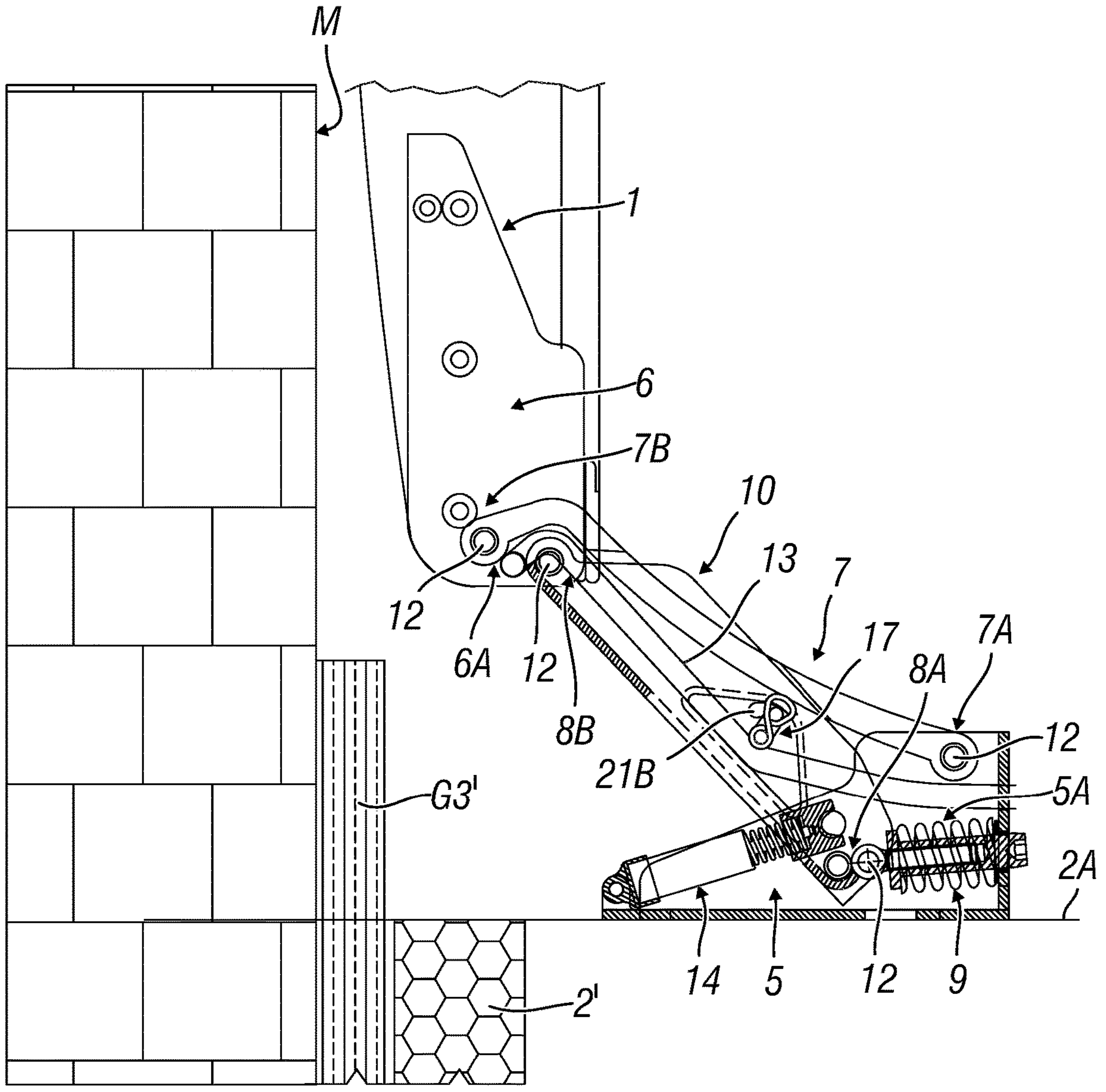

Finally, it is reaffirmed that the embodiment described so far has been provided purely by way of example and that numerous variants are possible, all falling within the same inventive concept, so for example, the hinge according to the invention can also be used in household appliances, and in particular non-built-in refrigerators, i.e. of the free-standing type. For example, FIG. 5 shows a hinge according to the invention adapted to connect a door 1' of a free-standing refrigerator 2', constrained to a flat face 1A' of said door 1', to the body 2' (partially shown) of said refrigerator, at an opening 4'.

A further variant of the invention provides a different shape of one or both of the support structures 6, 7 and/or of one or both of the connecting elements 7 and 8, which could therefore also have a different shape from the one illustrated so far, while maintaining the dimensional relationships between the relative rotation axes A1, A2, A3, A4 previously indicated.

It should also be noted that the hinges according to the invention can have a vertical or horizontal rotation axis. Finally, it is reaffirmed that the end-of-stroke member 17 and/or the second deformable member 14 are non-essential members for the invention.

The invention claimed is:

1. A hinge for a household appliance, adapted to connect together at least one closing element (1, 1') with the body (2) of said household appliance (3) at an opening (4) provided in said body, said hinge allowing to roto-translate said closing element (1, 1') between a first operating position (P1) in which it closes said opening (4), to a second operating position (P2, P3) angularly spaced by at least 90° with respect to said first operating position (P1), said hinge comprising:

a first support structure (5) comprising a first flat wall (5D) adapted to be constrained to a front bearing structure or wall (2A) of the body (2) of said household appliance (3), a second support structure (6) comprising a second flat wall (6D) adapted to be constrained to said closing element (1, 1'), a first (7) and a second (8) connecting element adapted to connect together said first (5) and second (6) support structures, and a first elastically deformable member (9) which interacts with at least one (8) of said two connecting elements to exert a force that pushes said closing element (1, 1') against said opening (4) of the body (2) of the household appliance at least when said closing element (1, 1') is in its first operating position (P1), wherein said first and second connecting elements (7, 8) and the first and second support structures (5, 6) form an articulated quadrilateral system (10):

the four components of said articulated quadrilateral system (10) comprising: said first connecting element (7), said second connecting element (8), and at least one first (5A) and one second (6A) portion of said first (5) and second (6) support structures, respectively, said articulated quadrilateral system (10) being adapted to define a member for opening and closing said closing element (1, 1') between said operating positions (P1-P3), said articulated quadrilateral system (10) comprising hinge elements (12) of end portions (7A, 7B, 8A, 8B) of said first (7) and second (8) connecting elements for connection to said first (5) and second (6) support structures, wherein in a closed position (C) of the articulated quadrilateral system (10), said closing element (1, 1') closes said opening (4) of the body (2) of the household appliance, and said first and second flat walls (5D, 6D), of the first (5) and second (6) support structures respectively, are substantially parallel to each other, wherein:

in the closed position (C) of the articulated quadrilateral system (10) the hinge axes (A1, A2, A3, A4) of the articulated quadrilateral system (10) define:

a first distance (D1) defined by the line passing through the hinge axes (A1, A2) provided in a first end (7A) and in a second end (7B) of the first connecting element (7), a second distance (D2) defined by the line passing through the hinge axes (A3, A4) provided in a first end (8A) and in a second end (8B) of the second connecting element (8), a third distance (D3) defined by the line passing through the hinge axes (A1, A3) provided in the first end (7A) of the first connecting element (7) and the first end (8A) of the second connecting element (8), a fourth distance (D4) defined by the line passing through the hinge axes (A2, A4) provided in the second end (7B) of the first connecting element (7) and the second end (8B) of the second connecting element (8), wherein:

the first distance (D1) is between 150.48 mm and 152.48 mm, the second distance (D2) is between 121.81 mm and 123.81 mm, the third distance (D3) is between 45.69 mm and 47.69 mm, the fourth distance (D4) is between 19.12 mm and 21.12 mm.

2. The hinge according to claim 1, wherein, in the closed position (C) of the articulated quadrilateral system, with the origin of a Cartesian axes system XY being fixed in the hinge axis (A4) of the second end (8B) of the second connecting element (8), the horizontal distance (X1) between the hinge axes (A4 and A2) of the second end (8B) of the second connecting element (8), and of the second end (7B) of the first connecting element (7), respectively, is between 5.00 mm and 7.00 mm, the horizontal distance (X2) between the hinge axes (A4 and A3) of the second and first ends (8B, 8A) of the second connecting element (8), respectively, is between 121.80 mm and 123.80 mm, the horizontal distance (X3) between the hinge axes (A4 and A1) of the second end (8B) of the second connecting element (8), and of the first end (7A) of the first connecting element (7), respectively, is between 155.80 mm and 157.80 mm, the vertical distance (Y1) between the hinge axes (A4 and A2) of the second end (8B) of the second connecting element (8), and of the second end (7B) of the first connecting element (7), respectively, is between 18.20 mm and 20.20 mm, the vertical distance (Y2) between the hinge axes (A4 and A3) of the second and first ends (8B, 8A) of the second connecting element (8), respectively, is between 0.50 mm and 2.50 mm, the vertical distance (Y3) between the hinge axes (A4 and A1) of the second end (8B) of the second connecting element (8), and of the first end (7A) of the first connecting element (7), respectively, is between 32.50 mm and 34.50 mm.

3. The hinge according to claim 1, wherein, in the closed position (C) of the articulated quadrilateral system, the hinge horizontal dimension (K1) is between 178 mm and 185 mm.

4. The hinge according to claim 1, wherein, in the closed position (C) of the articulated quadrilateral system, the vertical dimension (K2) of the first support structure (5) adapted to be constrained to the front bearing structure or wall (2A) of the body (2) of the household appliance (3), can vary according to the thickness(S) of the closing element (1), constrained to the second support structure (6) of the hinge, the minimum vertical dimension (K2) being between 50.20 mm and 52.20 mm.

5. The hinge according to claim 1, wherein it provides:

a first horizontal distance (X1) between the rotation axes (A4, A2), of the end pairs (7B and 8B) which are closer to each other than the first and second connecting elements (7 and 8), a second horizontal distance (X4) between the rotation axes (A1, A3), of the end pairs (7A and 8A) which are further apart from each other than the first and second connecting elements (7 and 8), a first vertical distance (Y1) between the rotation axes (A4, A2), of the end pairs (7B and 8B) which are closer to each other than the first and second connecting elements (7 and 8), a second vertical distance (Y5) between the rotation axes (A1, A3), of the end pairs (7A and 8A) which are further apart from each other than the first and second connecting elements (7 and 8);

wherein:

said first distance (X1) is between 5.4 mm and 6.6 mm, said second distance (X4) is between 33 mm and 35 mm, said first vertical distance (X1) is between 18.20 mm and 20.20 mm, said second vertical distance (Y5) is between 31 mm and 33 mm.

6. The hinge according to claim 1, wherein the first (7) and the second (8) connecting elements are sized and shaped so that during the movement of the hinge one (7) of said two connecting elements is at least partially housed inside the other ((8) connecting element, so as to reduce the empty space between one connecting element and the other.

7. The hinge according to claim 6, wherein one (7) of said two connecting elements has a substantially flat shape, and in that the other (8) of said two connecting elements comprises an upper wall (20A) and a lower wall (20B), substantially flat and parallel to each other and connected to each other by a vertical part (20C), which define a body with a 90° reversed U-shaped cross-section, wherein the height (H3) between the opposite faces of said two substantially flat and parallel walls (20A-B) is greater than the height (H4) of at least one portion (7E, 7F) of said one connecting element having a substantially flat shape, so that during the movement of the hinge at least one portion of said two substantially flat and parallel walls (20A-B) covers said at least one portion (7E, 7F) of said one connecting element having a substantially flat shape.

8. The hinge according claim 7, wherein the at least one portion (7E, 7F) of said connecting element (7) having a substantially flat shape, having a height (H4) less than the height (H3) between the opposite faces of said two walls (20A-B), substantially flat and parallel to each other comprises at an upper and lower surface of said connecting element (7), recessed portions (7E, 7F) which reduce the overall height of said connecting element (7).

9. The hinge according to claim 1, wherein one (8) of said two connecting elements comprises an upper wall (20A) and a lower wall (20B), substantially flat and parallel to each other and connected to each other by a vertical part (20C), which define a body with a 90° reversed U-shaped cross-section so as to make its production simple and make it more stable and resistant to bending.

10. The hinge according to claim 9, wherein the two substantially flat and parallel walls (20A-B) have an end portion (8B) which is closer to the support structure (6) adapted to be constrained to said closing element (1, 1'), having a rounded shape and protruding with respect to the main shape of said substantially flat and parallel walls (20 A-B), wherein said protruding end portion (8B) is shaped and sized so as to be at least partially housed in a concavity of a cranked part (7D) of the other connecting element (7) when the hinge is in a maximum opening position (P2, P3), and in that the curvature of this cranked part is equal to or greater than the curvature of this protruding and rounded part (8B).

11. The hinge according to claim 1, wherein one (7) of said two connecting elements has a substantially flat shape, with an arched profile which provides, going from one end portion (7A) to the other (7B), a first slightly arched part (7C) with a first concavity, facing the outside of the hinge, and a second part (7D) which provides a cranked bend with a concavity facing the inside of the hinge, and opposite to that of the arched part (7C).

12. The hinge according to claim 1, wherein it comprises a member (17) for adjusting the hinge maximum opening position (P2, P3), and in that said adjustment member (17) is positioned on one of the two connecting elements (8) and acts on the other (7) by limiting the approach between the same (7 and 8).

13. The hinge according to claim 1, wherein it comprises a member (17) for adjusting the hinge maximum opening position (P2, P3), and in that said adjustment member is at least partially housed in a recessed seat (20D, 20E) provided in the body of a connecting rod (20) of said one connecting element (8).

14. The hinge according to claim 1, wherein it comprises a member (17) for adjusting the hinge maximum opening position (P2, P3), and in that said adjustment member (17) comprises an elastically deformable element (28) adapted to make the stroke of the connecting rod (19) to which said member (17) is not constrained more gradual and "softer", in the desired end-of-stroke position.

15. The hinge according to claim 1, wherein it comprises a second deformable member (14), adapted to act as a damper and calibrate the force (F) exerted by the first deformable member (9) during the hinge closing phase.

16. The hinge according to claim 15, wherein the second deformable member (14) comprises a single-acting damper, adapted to act wherein a damping effect occurs only when a door closes and not also when the door is opened.

17. The hinge according to claim 15, wherein the second deformable member (14) is constrained to the connecting element (8) to which said first elastically deformable member (9) is also constrained.

18. The hinge according to claim 16, wherein both said deformable members (9, 14) act on said connecting element (8) to which they are connected, the second member (14) acting as a damper of the force exerted by the first member (9).

19. A hinge for a household appliance, adapted to connect together at least one closing element (1, 1') with the body (2) of said household appliance (3) at an opening (4) provided in said body, said hinge allowing to roto-translate said closing element (1, 1') between a first operating position (P1) in which it closes said opening (4), to a second operating position (P2, P3) angularly spaced by at least 90° with respect to said first operating position (P1), said hinge comprising:

a first support structure (5) comprising a first flat wall (5D) adapted to be constrained to a front bearing structure or wall (2A) of the body (2) of said household appliance (3), a second support structure (6) comprising a second flat wall (6D) adapted to be constrained to said closing element (1, 1'), a first (7) and a second (8) connecting element adapted to connect together said first (5) and second (6) support structures, and a first elastically deformable member (9) which interacts with at least one (8) of said two connecting elements to exert a force that pushes said closing element (1, 1') against said opening (4) of the body (2) of the household appliance at least when said closing element (1, 1') is in its first operating position (P1), wherein said first and second connecting elements (7, 8) and the first and second support structures (5, 6) form an articulated quadrilateral system (10):

the four components of said articulated quadrilateral system (10) comprising: said first connecting element (7), said second connecting element (8), and at least one first (5A) and one second (6A) portion of said first (5) and second (6) support structures, respectively, said articulated quadrilateral system (10) being adapted to define a member for opening and closing said closing element (1, 1') between said operating positions (P1-P3), said articulated quadrilateral system (10) comprising hinge elements (12) of end portions (7A, 7B, 8A, 8B) of said first (7) and second (8) connecting elements for connection to said first (5) and second (6) support structures, wherein in a closed position (C) of the articulated quadrilateral system (10), said closing element (1, 1') closes said opening (4) of the body (2) of the household appliance, and said first and second flat walls (5D, 6D), of the first (5) and second (6) support structures respectively, are substantially parallel to each other, wherein:

in the closed position (C) of the articulated quadrilateral system (10) the hinge axes (A1, A2, A3, A4) of the articulated quadrilateral system (10) define:

a first distance (D1) defined by the line passing through the hinge axes (A1, A2) provided in a first end (7A) and in a second end (7B) of the first connecting element (7), a second distance (D2) defined by the line passing through the hinge axes (A3, A4) provided in a first end (8A) and in a second end (8B) of the second connecting element (8), a third distance (D3) defined by the line passing through the hinge axes (A1, A3) provided in the first end (7A) of the first connecting element (7) and the first end (8A) of the second connecting element (8), a fourth distance (D4) defined by the line passing through the hinge axes (A2, A4) provided in the second end (7B) of the first connecting element (7) and the second end (8B) of the second connecting element (8), wherein:

the first distance (D1) is between 150.48 mm and 152.48 mm, the second distance (D2) is between 121.81 mm and 123.81 mm, the third distance (D3) is between 45.69 mm and 47.69 mm, the fourth distance (D4) is between 19.12 mm and 21.12 mm;

wherein one (8) of said two connecting elements comprises an upper wall (20A) and a lower wall (20B), substantially flat and parallel to each other and connected to each other by a vertical part (20C), which define a body with a 90° reversed U-shaped cross-section so as to make its production simple and make it more stable and resistant to bending.

20. A hinge for a household appliance, adapted to connect together at least one closing element (1, 1') with the body (2) of said household appliance (3) at an opening (4) provided in said body, said hinge allowing to roto-translate said closing element (1, 1') between a first operating position (P1) in which it closes said opening (4), to a second operating position (P2, P3) angularly spaced by at least 90° with respect to said first operating position (P1), said hinge comprising:

a first support structure (5) comprising a first flat wall (5D) adapted to be constrained to a front bearing structure or wall (2A) of the body (2) of said household appliance (3), a second support structure (6) comprising a second flat wall (6D) adapted to be constrained to said closing element (1, 1'), a first (7) and a second (8) connecting element adapted to connect together said first (5) and second (6) support structures, and a first elastically deformable member (9) which interacts with at least one (8) of said two connecting elements to exert a force that pushes said closing element (1, 1') against said opening (4) of the body (2) of the household appliance at least when said closing element (1, 1') is in its first operating position (P1), wherein said first and second connecting elements (7, 8) and the first and second support structures (5, 6) form an articulated quadrilateral system (10):

the four components of said articulated quadrilateral system (10) comprising: said first connecting element (7), said second connecting element (8), and at least one first (5A) and one second (6A) portion of said first (5) and second (6) support structures, respectively, said articulated quadrilateral system (10) being adapted to define a member for opening and closing said closing element (1, 1') between said operating positions (P1-P3), said articulated quadrilateral system (10) comprising hinge elements (12) of end portions (7A, 7B, 8A, 8B) of said first (7) and second (8) connecting elements for connection to said first (5) and second (6) support structures, wherein in a closed position (C) of the articulated quadrilateral system (10), said closing element (1, 1')

closes said opening (4) of the body (2) of the household appliance, and said first and second flat walls (5D, 6D), of the first (5) and second (6) support structures respectively, are substantially parallel to each other, wherein:

in the closed position (C) of the articulated quadrilateral system (10) the hinge axes (A1, A2, A3, A4) of the articulated quadrilateral system (10) define:

a first distance (D1) defined by the line passing through the hinge axes (A1, A2) provided in a first end (7A) and in a second end (7B) of the first connecting element (7), a second distance (D2) defined by the line passing through the hinge axes (A3, A4) provided in a first end (8A) and in a second end (8B) of the second connecting element (8), a third distance (D3) defined by the line passing through the hinge axes (A1, A3) provided in the first end (7A) of the first connecting element (7) and the first end (8A) of the second connecting element (8), a fourth distance (D4) defined by the line passing through the hinge axes (A2, A4) provided in the second end (7B) of the first connecting element (7) and the second end (8B) of the second connecting element (8), wherein:

the first distance (D1) is between 150.48 mm and 152.48 mm, the second distance (D2) is between 121.81 mm and 123.81 mm, the third distance (D3) is between 45.69 mm and 47.69 mm, the fourth distance (D4) is between 19.12 mm and 21.12 mm;

wherein the hinge comprises a member (17) for adjusting the hinge maximum opening position (P2, P3), and in that said adjustment member (17) is positioned on one of the two connecting elements (8) and acts on the other (7) by limiting the approach between the same (7 and 8).

* * * * *